(12) United States Patent
Holmes et al.

(10) Patent No.: US 8,861,055 B2
(45) Date of Patent: Oct. 14, 2014

(54) SECURITY DEVICE

(75) Inventors: Brian William Holmes, Fleet (GB);
Lawrence George Commander, Tilehurst (GB)

(73) Assignee: De La Rue International Limited, Hampshire (GB)

( * ) Notice: Subject to any disclaimer, the term of this patent is extended or adjusted under 35 U.S.C. 154(b) by 207 days.

(21) Appl. No.: 13/502,281

(22) PCT Filed: Oct. 27, 2010

(86) PCT No.: PCT/GB2010/001995
§ 371 (c)(1),
(2), (4) Date: Jun. 28, 2012

(87) PCT Pub. No.: WO2011/051670
PCT Pub. Date: May 5, 2011

(65) Prior Publication Data
US 2012/0274998 A1    Nov. 1, 2012

Related U.S. Application Data

(60) Provisional application No. 61/272,773, filed on Oct. 30, 2009.

(30) Foreign Application Priority Data

Oct. 30, 2009   (GB) .................................. 0919108.1

(51) Int. Cl.
*G03H 1/00* (2006.01)
*G02B 5/32* (2006.01)
*G02B 27/22* (2006.01)
*B42D 15/00* (2006.01)

(52) U.S. Cl.
CPC ........ *B42D 15/0013* (2013.01); *B42D 2035/28* (2013.01); *B42D 2035/44* (2013.01); *G02B 27/2214* (2013.01); *B42D 2035/20* (2013.01)
USPC ................................................. 359/2; 359/15

(58) Field of Classification Search
CPC combination set(s) only.
See application file for complete search history.

(56) References Cited

U.S. PATENT DOCUMENTS

| 4,417,784 A | 11/1983 | Knop et al. |
| 4,652,015 A | 3/1987 | Crane |
| 4,856,857 A | 8/1989 | Takeuchi et al. |
| 4,892,336 A | 1/1990 | Kaule et al. |
| 7,830,627 B2 * | 11/2010 | Commander et al. ........ 359/820 |

(Continued)

FOREIGN PATENT DOCUMENTS

| DE | 10 2006 029 852 A1 | 1/2008 |
| EP | 0 059 056 A1 | 9/1982 |

(Continued)

OTHER PUBLICATIONS

May 30, 2011 International Search Report issued in International Patent Application No. PCT/GB2010/001995.

*Primary Examiner* — Jade R Chwasz
(74) *Attorney, Agent, or Firm* — Oliff PLC

(57) ABSTRACT

A security device having a lenticular device that includes an array of lenticular focusing elements located over a corresponding array of sets of image strips such that at different viewing directions, a corresponding image strip from each set is viewed via respective ones of the lenticular focusing elements wherein the image strips are defined at least in part by a relief structure.

26 Claims, 23 Drawing Sheets

(56) References Cited

U.S. PATENT DOCUMENTS

| | | |
|---|---|---|
| 2003/0179364 A1* | 9/2003 | Steenblik et al. ............... 356/71 |
| 2005/0180020 A1 | 8/2005 | Steenblik et al. |
| 2006/0290136 A1 | 12/2006 | Alasia et al. |
| 2008/0036196 A1 | 2/2008 | Steenblik et al. |
| 2008/0165423 A1 | 7/2008 | Steenblik et al. |
| 2008/0182084 A1 | 7/2008 | Tompkin et al. |
| 2008/0212192 A1 | 9/2008 | Steenblik et al. |
| 2008/0212193 A1 | 9/2008 | Steenblik et al. |
| 2009/0021840 A1 | 1/2009 | Steenblik et al. |
| 2009/0122412 A1* | 5/2009 | Steenblik et al. ............ 359/626 |
| 2009/0297805 A1 | 12/2009 | Dichtl |

FOREIGN PATENT DOCUMENTS

| | | |
|---|---|---|
| EP | 0 723 501 B1 | 7/1997 |
| EP | 0 724 519 B1 | 7/1997 |
| EP | 0 860 298 A2 | 8/1998 |
| EP | 1 141 480 B1 | 2/2004 |
| EP | 1 398 174 A1 | 3/2004 |
| EP | 1 897 700 A2 | 3/2008 |
| EP | 1 953 002 A2 | 8/2008 |
| WO | WO 83/00659 A1 | 3/1983 |
| WO | WO 94/27254 A1 | 11/1994 |
| WO | WO 03/054297 A2 | 7/2003 |
| WO | WO 03/061983 A1 | 7/2003 |
| WO | WO 03/091952 A2 | 11/2003 |
| WO | WO 03/091953 A2 | 11/2003 |
| WO | WO 03/095188 A2 | 11/2003 |
| WO | WO 2005/052650 A2 | 6/2005 |
| WO | WO 2005/106601 A2 | 11/2005 |
| WO | WO 2005/115119 A2 | 12/2005 |

* cited by examiner

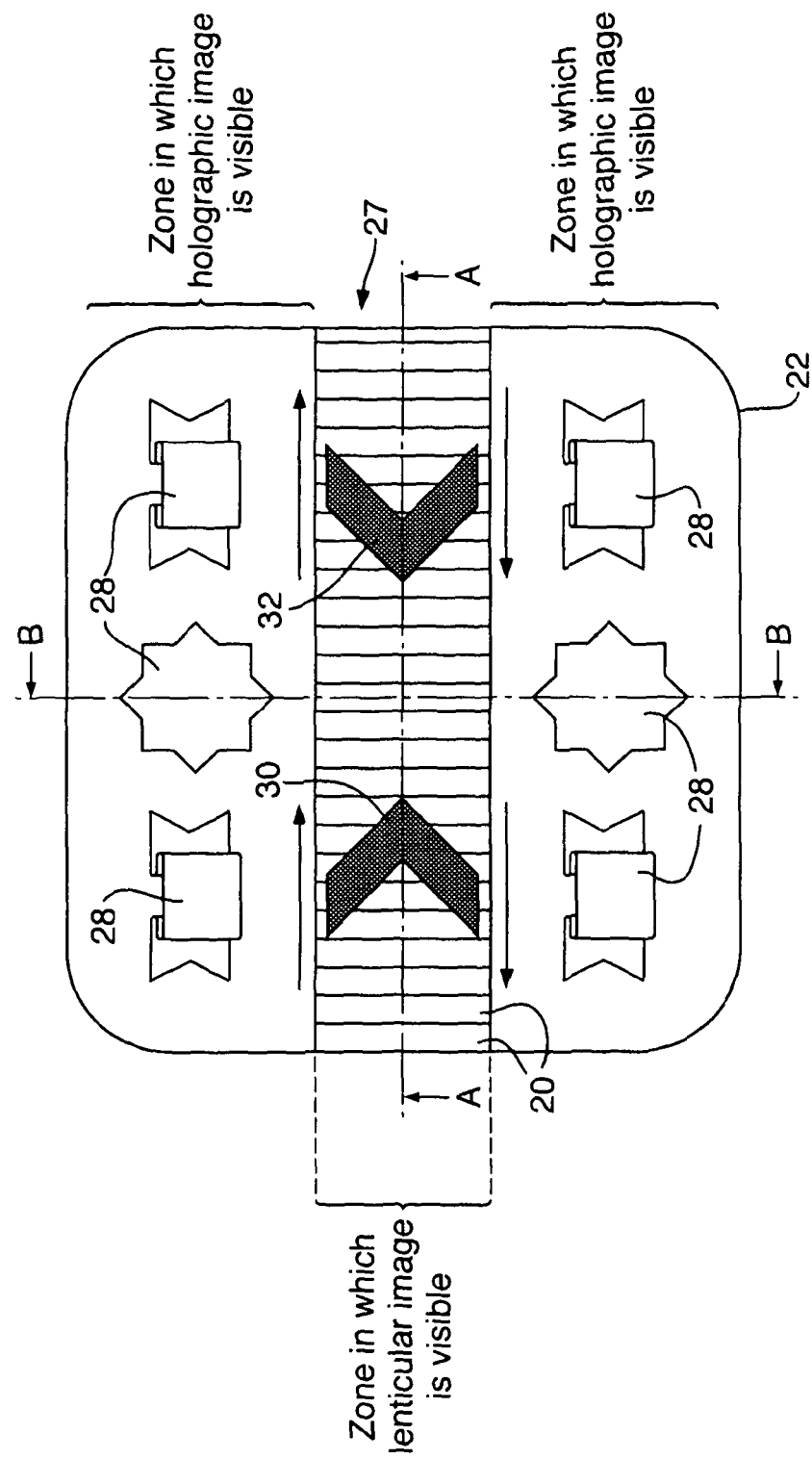

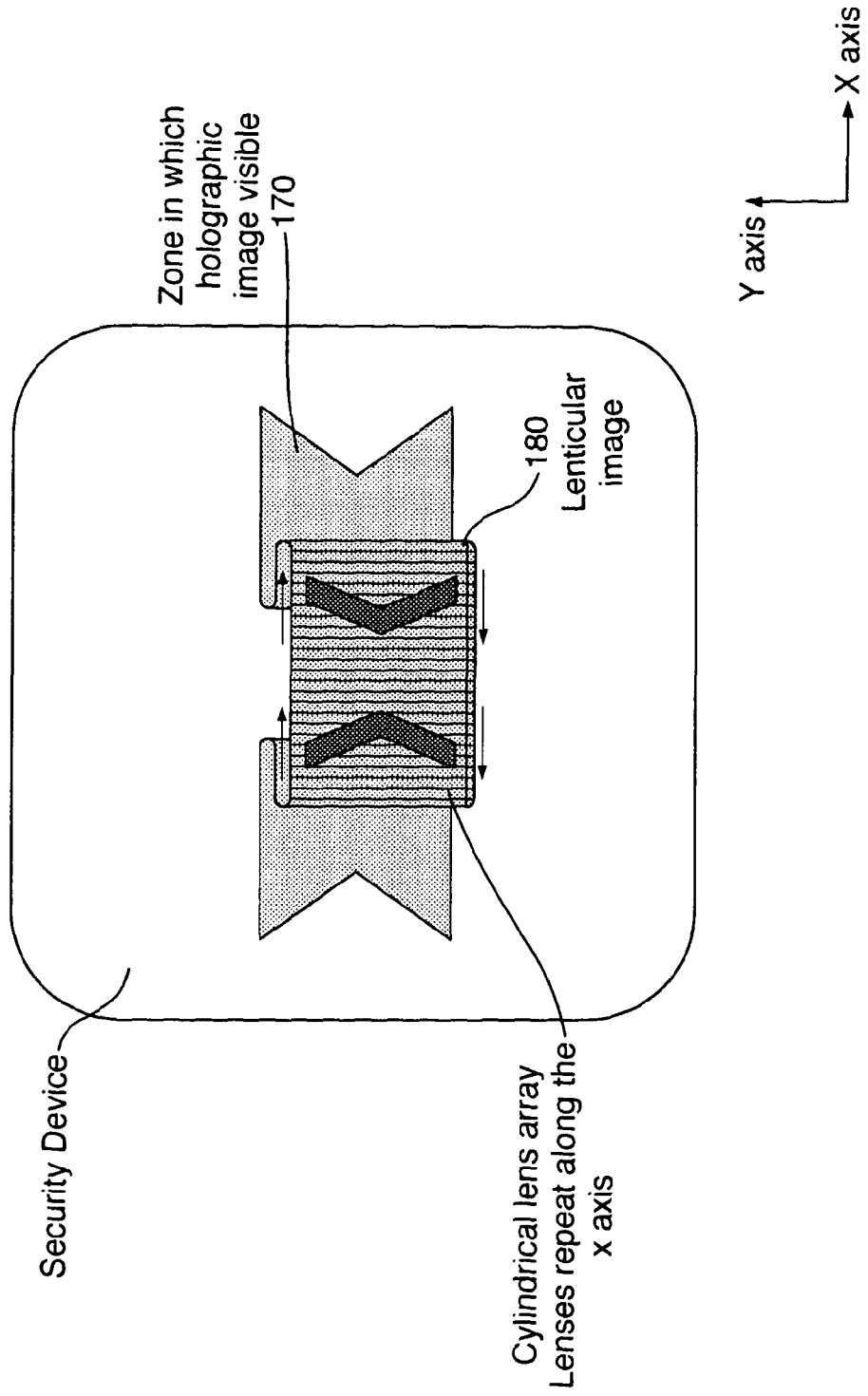

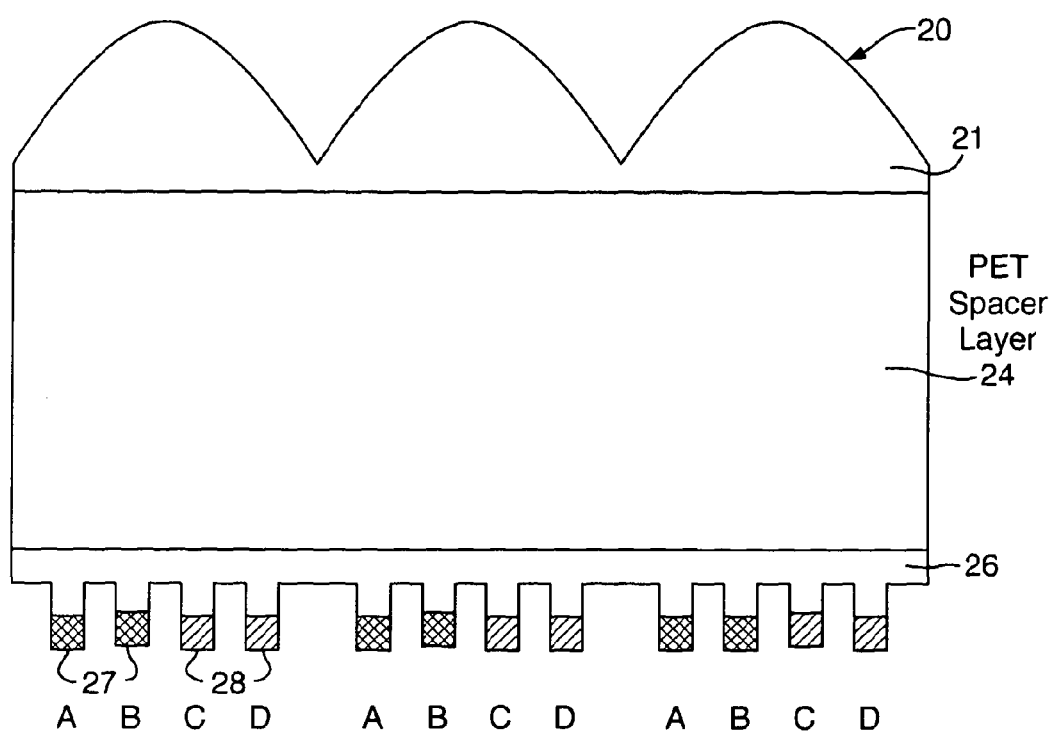

Fig. 10.
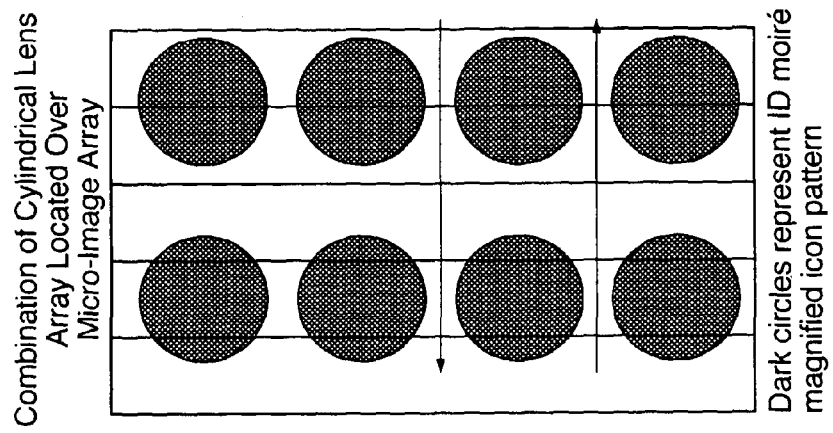
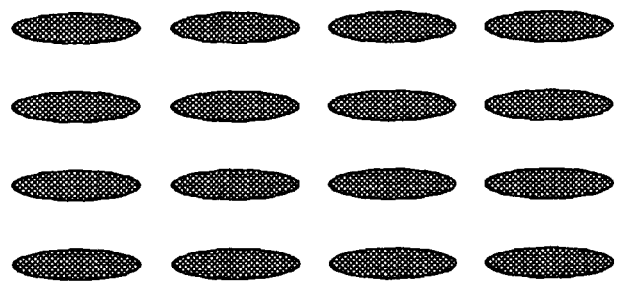
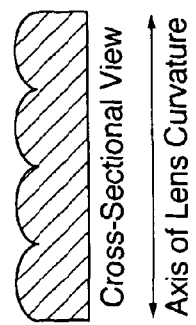

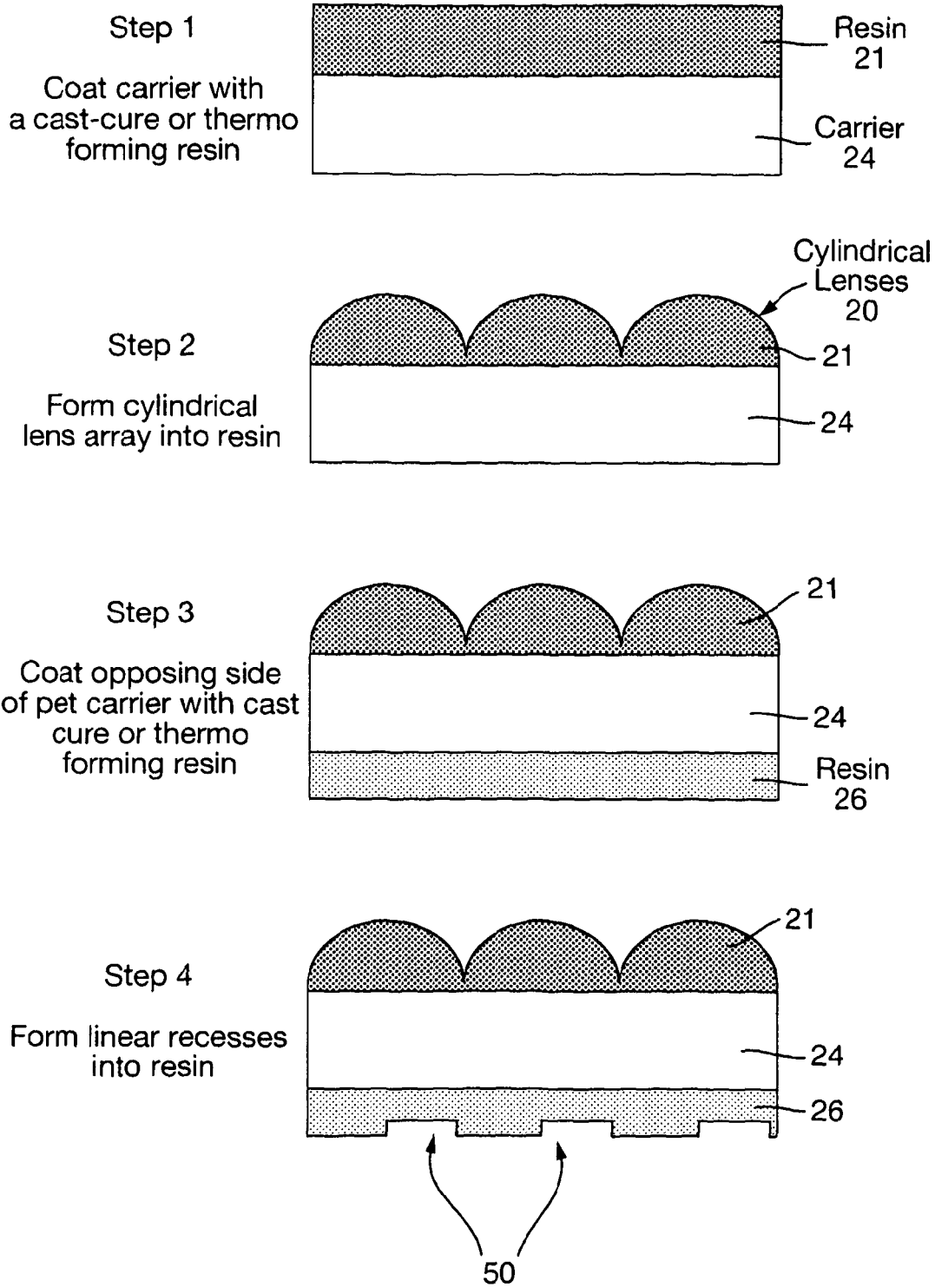

Fig.11 (Cont).
Step 5
Uniformily coat surface, containing linear recesses, with first colourant.
Coating Method: Typically via Gravure or Annilox roller
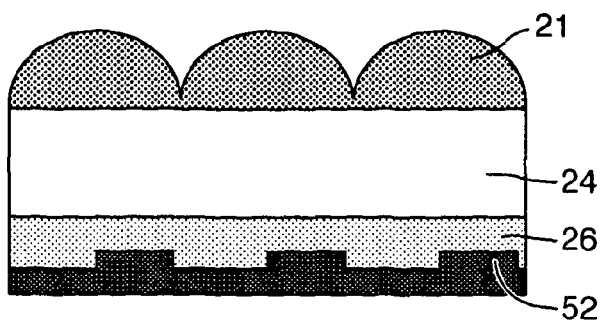
Step 6
First colourant is removed from non recessed land regions by method of Doctor Blading
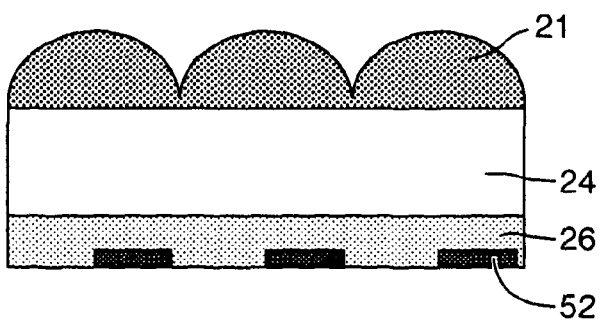
Step 7
Uniformily coat surface with second colourant.
Second colourant visible in land regions.
Coating method: Typically Gravure
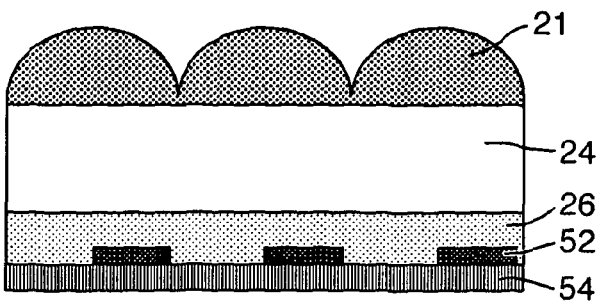

Fig. 12.
Steps 1 - 4 As With Fig. 9.
Step 5A
Transfer first colourant onto non recessed linear regions by offset transfer.
Coating method: Offset from Annilox roller or litho blanket
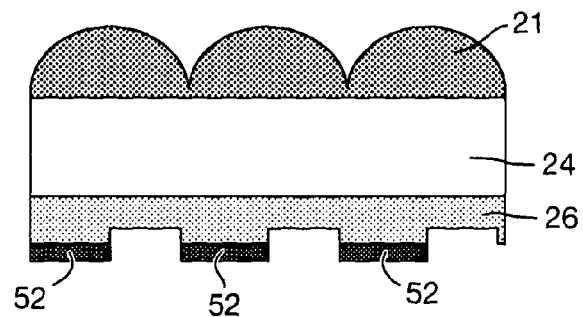
Step 6A
Uniformily coat with second colourant.
Coating method: Typically Gravure or offset litho
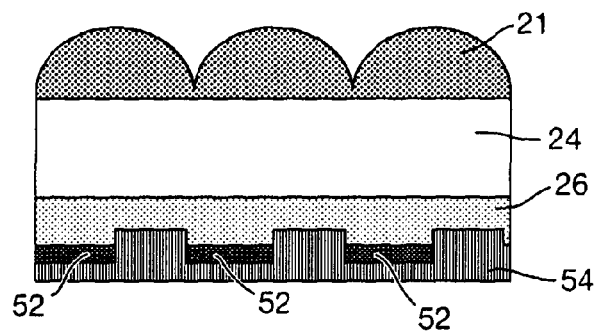

Fig. 13.

Figure showing fabrication process for micro-lenticular system based on alternating sections of diffractive surface relief

Step 1

Coat side of carrier (remote to observer) with cast cure or thermo forming resin

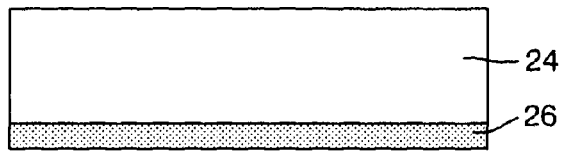

Step 2

Simultaneously form surface relief grating structure for image areas of views A and B into resin layer

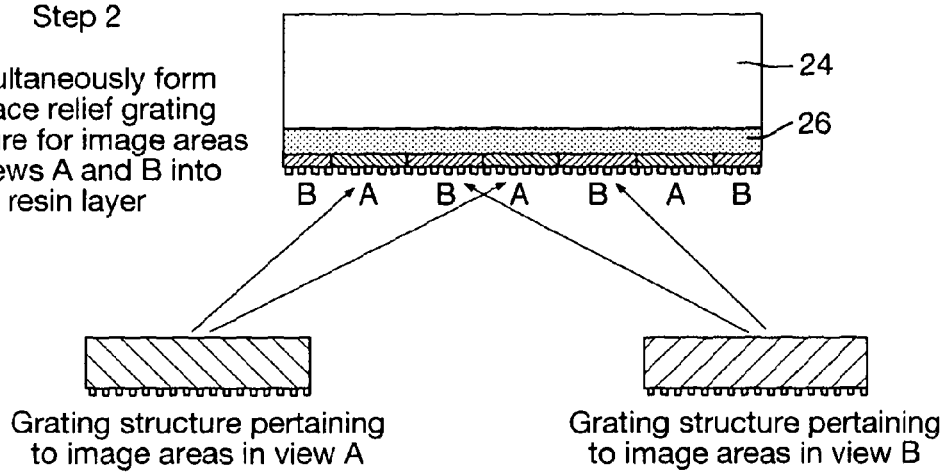

Grating structure pertaining to image areas in view A

Grating structure pertaining to image areas in view B

Fig. 13 (Cont).
Figure showing fabrication process for micro-lenticular system based on alternating sections of diffractive surface relief
Step 3
Apply reflection coating to grating surface relief structure
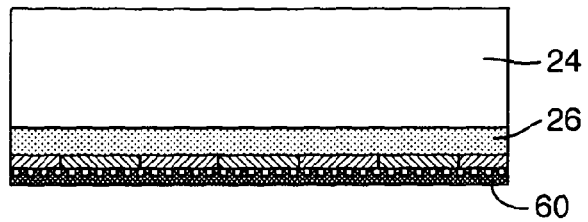
Step 4
Coat side of carrier nearest observer with a cast cure or thermo forming resin
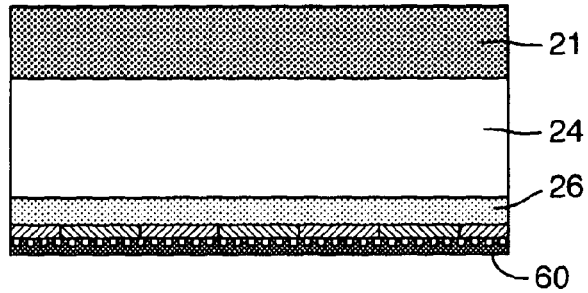
Step 5
Form cylindrical lens array into resin
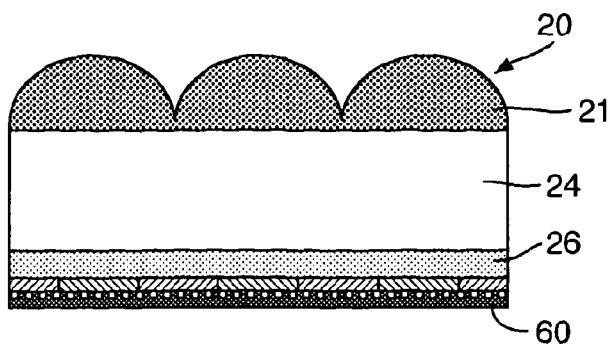

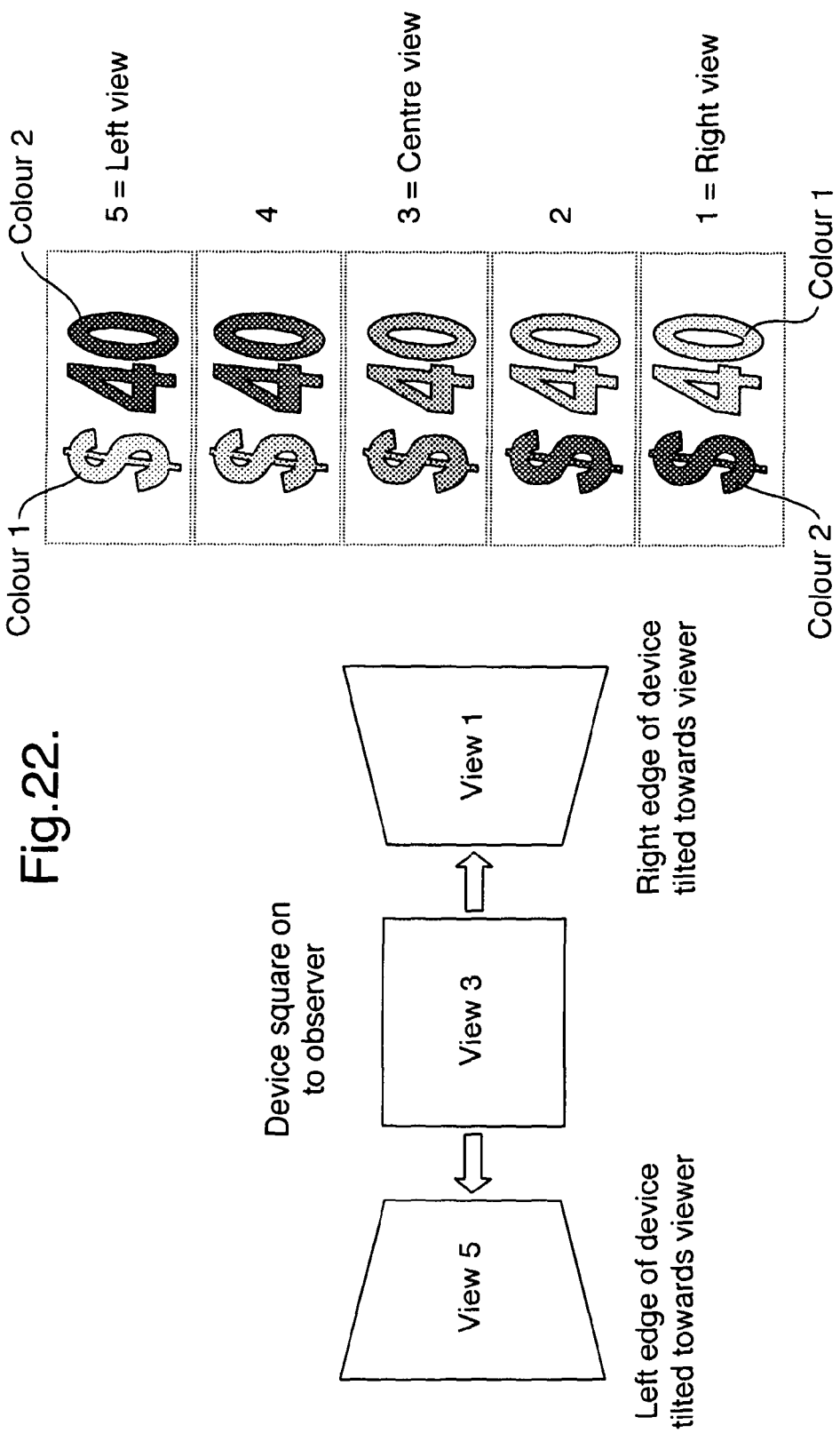

SECURITY DEVICE

The invention relates to a security device, for example for use on articles of value such as banknotes, cheques, passports, identity cards, certificates of authenticity, fiscal stamps and other documents for securing value or personal identity.

Many different optical security devices are known of which the most common are holograms and other diffractive devices which are often found on credit cards and the like. It is also known to provide security devices in the form of moiré magnifiers as, for example, described in EP-A-1695121 and WO-A-94/27254. A disadvantage of moiré magnifiers is that the artwork is more restricted, for instance an animation effect would not be possible with a moiré magnifier.

It has also been known that so-called lenticular devices can be used as security devices as, for example, described in U.S. Pat. No. 4,892,336. However, these devices have never had much commercial success as security devices because of practical constraints on the thickness of substrates with which they must be used. To understand the reasons for this, we refer to FIG. 1.

FIG. 1 shows a cross-section through a lenticular device which is being used to view images A-G. An array of cylindrical lenses 2 is arranged on a transparent substrate 4. Each image is segmented into a number of strips, for example 7 and under each lens 2 of the lenticular array, there is a set of image strips corresponding to a particular segmented region of images A-G. Under the first lens the strips will each correspond to the first segment of images A-G and under the next lens the strips will each correspond to the second segment of images A-G and so forth. Each lens 2 is arranged to focus in the plane of the strips such that only one strip can be viewed from one viewing position through each lens 2. At any viewing angle, only the strips corresponding to one of the images (A,B,C etc.) will be seen through the corresponding lenses. As shown, each strip of image D will be seen from straight on whereas on tilting a few degrees off-axis the strips from images C or E will be seen.

The strips are arranged as slices of an image, i.e. the strips A are all slices from one image, similarly for B, C etc. As a result, as the device is tilted a series of images will be seen. The images could be related or unrelated. The simplest device would have two images that would flip between each other as the device is tilted. Alternatively, the images could be a series of images that are shifted laterally strip to strip so that the image appears to move and thus give rise to parallax depth. Similarly, the change from image to image could give rise to animations (parts of the image change in a quasi-continuous fashion), morphing (one image transforms in small steps to another image) or zooming (an image gets larger or smaller in steps). These more sophisticated effects require more images and thus more strips.

A practical problem with lenticular devices is that the thickness is dependent on the width and number of the interlaced image strips. Referring to FIG. 1 in order for the device to function the back focal length, f, of the lenses 2 must be such that it focuses on the image strips A,B,C,D,E,F,G and the repeating period, p, of the image strips must be the same as the lens diameter, D. The back focal length of the lens is defined as the distance from the back surface of the lens to the focal point. As a general guide for polymer films $f_{min}=1$-$1.5\times D$. Therefore for a device to be 30 um thick the lens diameter must be no greater than 30 um. Consequently, the repeat period for the image strips would have to be no more than 30 um. This is not practical with conventional printing techniques such as gravure, lithography and intaglio which can at best achieve resolutions of 20 um/pixel correlating to 1200 dpi. The need to register colours to each other and to the lenticular place further demands on the printer. Commercially available lenticular devices are therefore relatively thick (>150 um) and this has prevented their use on/in flexible security documents such as banknotes where devices typically have thicknesses in the range 1-50 um.

To be integrated into a secure document, a lenticular device needs to be thin. As a consequence, such a (micro-)lenticular device will have some inherent security since the authenticator can check the device thickness and flexibility. Paper (including banknote paper) is typically ~100 μm thick and ideally a micro-lenticular device incorporated into or onto the device will be less than half the thickness—the thinner the micro-lenticular device, the more integrated it will feel to the touch. As outlined above with conventional printing techniques, however, it is not possible to reduce the thickness sufficiently.

Examples of structures in which the image strips are formed by a relief can be found in U.S. Pat. No. 4,417,784 and US-A-2006/0290136. The relief structures described in US-A-2006/0290136 are simple embossed or debossed structures and provide little or no contrast to the flat background regions and furthermore the use of colour is solely through the colour of the substrate and is therefore limited. The relief structures described in U.S. Pat. No. 4,417,784 are diffractive gratings which are complex to produce and it is difficult for the authenticator to differentiate between the lenticular optical effect and the diffractive optical effect. In general the use of diffractive structures in lenticular devices is limited as their brightness and visibility is dependent on the lighting conditions and the visibility will be significantly reduced in low lighting conditions.

In accordance with a first aspect of the present invention, a security device has a lenticular device comprising an array of lenticular focusing elements located over a corresponding array of sets of image strips such that at different viewing directions, a corresponding image strip from each set is viewed via respective ones of the lenticular focusing elements wherein the image strips are defined at least in part by a relief structure, characterised in that the relief structure comprises raised features provided with ink.

In accordance with a second aspect of the present invention, a security device has a lenticular device comprising an array of lenticular focusing elements located over a corresponding array of sets of image strips such that at different viewing directions, a corresponding image strip from each set is viewed via respective ones of the lenticular focusing elements wherein the image strips are defined at least in part by a relief structure, characterised in that the image strip relief structure is provided in a substrate which is also provided with at least one other relief structure separate from the lenticular device.

In accordance with a third aspect of the present invention, a method of manufacturing a security device comprises providing an array of lenticular focusing elements on one side of a transparent substrate; and providing a corresponding array of sets of image strips on the other side of the transparent substrate, the image strips and lenticular focusing elements defining a lenticular device such that at different viewing directions a corresponding image strip from each set is viewed via respective lenticular focusing elements, wherein the image strips are formed at least in part as a relief structure, characterised in that the relief structure comprises raised features provided with ink.

In accordance with a fourth aspect of the present invention, a method of manufacturing a security device comprises providing an array of lenticular focusing elements on one side of a transparent substrate; and providing a corresponding array of sets of image strips on the other side of the transparent substrate, the image strips and lenticular focusing elements defining a lenticular device such that at different viewing directions a corresponding image strip from each set is viewed via respective lenticular focusing elements, wherein the image strips are formed at least in part as a relief structure, characterised in that the image strip relief structure is provided in a substrate which is also provided with at least one other relief structure separate from the lenticular device.

We have realised that it is advantageous to take advantage of forming the image strips wholly or partially as a relief structure by inking the structures and/or providing another relief structure. Cast-curing or embossing could be used to provide the relief structure, cast-curing providing higher fidelity of replication.

A variety of different relief structures can be used as will be described in more detail below. However, the image strips could simply be created by embossing/cast-curing the images as diffraction grating areas. Differing parts of the image could be differentiated by the use of differing pitches or different orientations of grating. Alternative (and/or additional differentiating) image structures are anti-reflection structures such as moth-eye (see for example WO-A-2005/106601), zero-order diffraction structures, stepped surface relief optical structures known as Aztec structures (see for example WO-A-2005/115119) or simple scattering structures. For most applications, these structures could be partially or fully metallised to enhance brightness and contrast.

Typically, the width of each image strip is less than 50 microns, preferably less than 20 microns, most preferably in the range 5-10 microns.

Typical thicknesses of security devices according to the invention are 2-100 microns, more preferably 20-50 microns with lens heights of 1-50 microns, more preferably 5-25 microns. The periodicity and therefore maximum base diameter for the lenticular focussing elements is preferably in the range 5-200 μm, more preferably 10-60 μm and even more preferably 20-40 μm. The f number for the lenticular focussing elements is preferably in the range 0.25-16 and more preferably 0.5-2. The relief depth depends on the method used to form the relief where the relief is provided by a diffractive grating the depth would typically be in the range 0.05-1 μm and where a coarser non diffractive relief structure is used the relief depth is preferably in the range 0.5-10 μm and even more preferably 1-5 μm Typically, the lenticular focusing elements comprise cylindrical lenses but it would also be possible to utilize lenticular micromirrors.

In some cases of the second and fourth aspects of the invention, the image strips will be uninked, typically when in the form of gratings and the like. However, it is also possible to incorporate ink either by filling recesses of the relief structure or onto raised features of the relief structure. Relief structures could, for example, be created by cast-curing or embossing and then the recesses or pits filled by a liquid ink, the excess being removed by a doctor blade or the like. The ink could be a gravure type or ink jet type ink.

In the case of raised areas, in accordance with the first and third aspects of the invention, these could be inked by methods analogous to offset litho printing or flexographic printing. The inking of raised areas has the advantage that it is better suited to multiple colours since the doctoring process would inevitably mix different inked areas. Multiple colours allow different coloured elements to pass by each other in a movement type design. Particularly attractive is to use a wet litho process to ink the raised areas since this would allow some simple colour based effects (e.g. image flip or a simple moiré effect of moving lines produced by a pitch of colours that doesn't quite match the lens pitch) with the higher resolution raised image effects.

In the case of inking the raised areas the height of the raised area must be greater than the thickness of ink applied to prevent the ink entering the adjacent non-raised regions.

In some cases, the security device can comprise solely a lenticular device. However, in particularly preferred examples, and according to the second and fourth aspects of the invention, the image strip relief structure is provided in a substrate which is also provided with at least one other relief structure separate from the lenticular device. The provision of at least one other relief structure enables further security to be achieved. For example, the at least one other relief structure may comprise a holographic structure or microimages suitable for moiré magnification, in the latter case the security device further comprising a moiré magnification lens array located over the microimages. In the case of 1D moiré magnification devices both the lenticular device and the moiré magnifier can work with the same lenticular lens array removing the requirement for a separate lens array.

It will be readily understood that particularly secure devices can be achieved by linking the images viewed from the lenticular device and other relief structure or by providing a contrast between them. In some cases, the lenticular device may provide an apparently moving image as the device is tipped while the other relief structure is used to provide different effects such as a 3D holographic effect or the like. It is particularly advantageous if the other relief structure forms part of a moiré magnification device which also provides parallactic motion in one dimension, for example parallel to that of the lenticular image, or in two dimensions.

The security device can be manufactured in a variety of ways, for example by embossing or cast-curing the lenticular focusing element array on one side of the substrate at one forming station and the relief structure on the other side of the substrate at another forming location.

It is particularly convenient, however, if the manufacturing steps are carried out by passing the transparent substrate between two rolls, one roll being adapted to impress the lenticular focusing element array into one side of the substrate and the other roll being adapted to impress the image strip relief structure into the other side of the substrate simultaneously. This then ensures that there is registration between the focusing element array and the image strips.

Another way to ensure registration is first to provide the lenticular focusing element array and then to pass the substrate between two rolls, one of which has a surface conforming to the lenticular focusing element array and the other of which is used to impart the image strip relief structure. In this way, the image strip relief structure will be registered to the lenticular focusing element array.

The security device may comprise a metallised layer either as part of the image structures or as an additional layer. Preferably such a layer is selectively demetallised at a number of locations. In addition the device may further comprise a layer of resist upon the metallised layer. The metallised layer and/or the layer of resist is preferably arranged as indicia.

It is also preferred that the device is arranged to be machine-readable. This may be achieved in a number of ways. For example at least one layer of the device (optionally as a separate layer) may further comprise machine-readable material. Preferably the machine-readable material is a magnetic material, such as magnetite. The machine-readable material may be responsive to an external stimulus. Furthermore, when the machine-readable material is formed into a layer, this layer may be transparent.

The security device may be used in many different applications, for example by attachment to objects of value. Preferably, the security devices are adhered to or substantially contained within a security document. The security device may therefore be attached to a surface of such a document or it may be partially embedded within the document. The security device may take various different forms for use with security documents, these including a security thread, a security fibre, a security patch, a security strip, a security stripe or a security foil as non-limiting examples.

Some examples of security devices and methods according to the invention will now be described and contrasted with a known device with reference to the accompanying drawings, in which:—

FIG. 5A is a plan view of a first example of a security device according to the invention;

FIG. 5B illustrates integrated holographic and lenticular devices;

FIG. 7 illustrates a lenticular device having four image strips;

FIG. 10 illustrates the components of a moiré magnification system;

FIG. 11 illustrates successive stages in a first example of a method of manufacturing a security device according to the invention;

FIG. 12 illustrates a modification of the method of FIG. 11;

FIG. 13 illustrates successive steps for manufacturing a security device according to a another example of the invention;

FIGS. 20 to 22 illustrate further lenticular effects.

Figure 1:
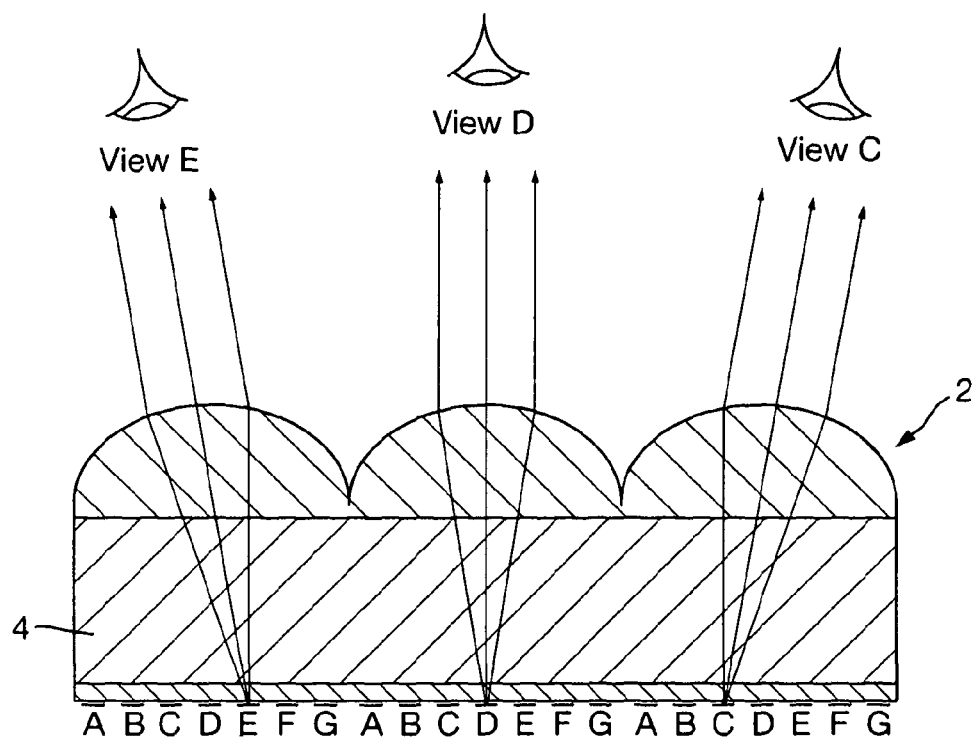
FIG. 1 is a schematic cross-section through a known lenticular device.
Figure 2:
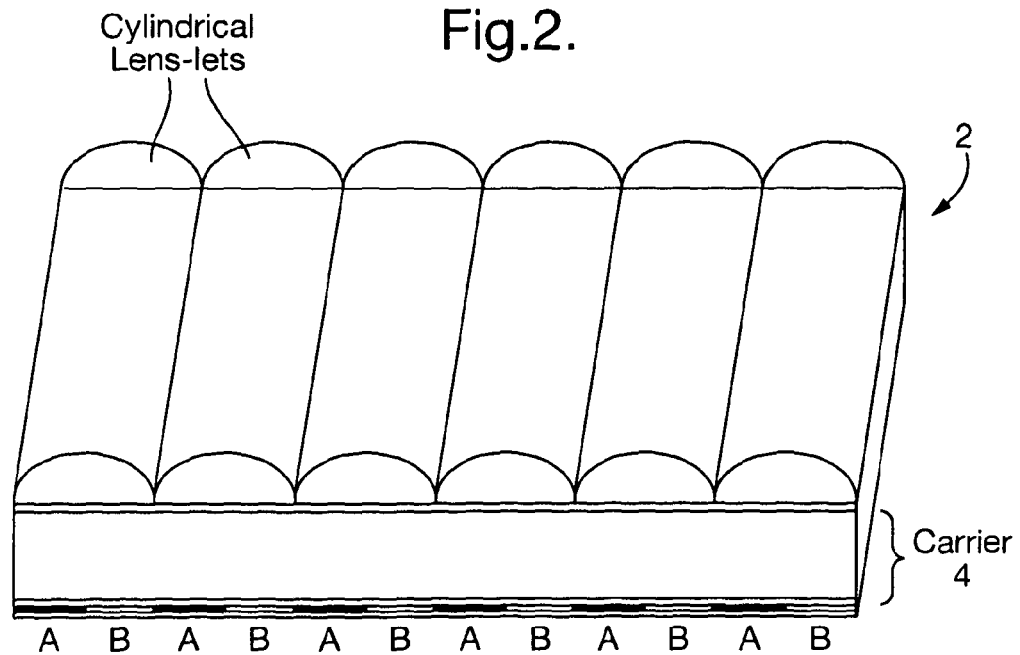
FIG. 2 is a perspective view from above of a modified form of the known lenticular device of FIG. 1.
Figure 3:
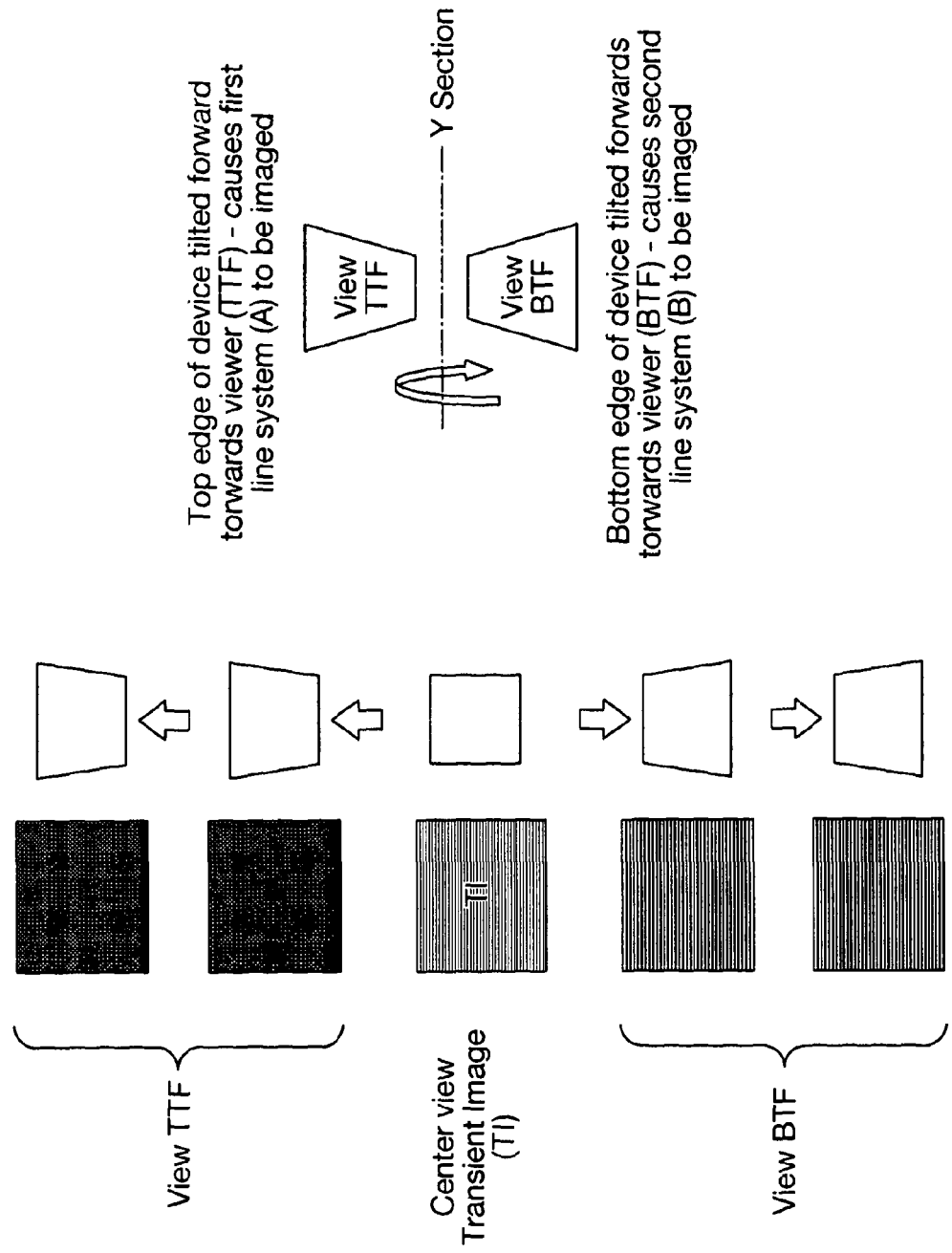
FIG. 3 illustrates the appearance of the device of FIG. 2 at different tilt angles.

A known lenticular device is shown in FIGS. 1-3. FIG. 1 has already been described above while FIG. 2 shows the lenticular device in perspective view although for simplicity only two image strips per lens are shown labelled A,B respectively. The appearance of the device shown in FIG. 2 to the observer is illustrated in FIG. 3. Thus, when the device is arranged with its top tilted forward (view TTF), the image strips A will be seen while when the device is arranged with its bottom tilted forward (view BTF) then the image strips B will be seen.

Figure 4:
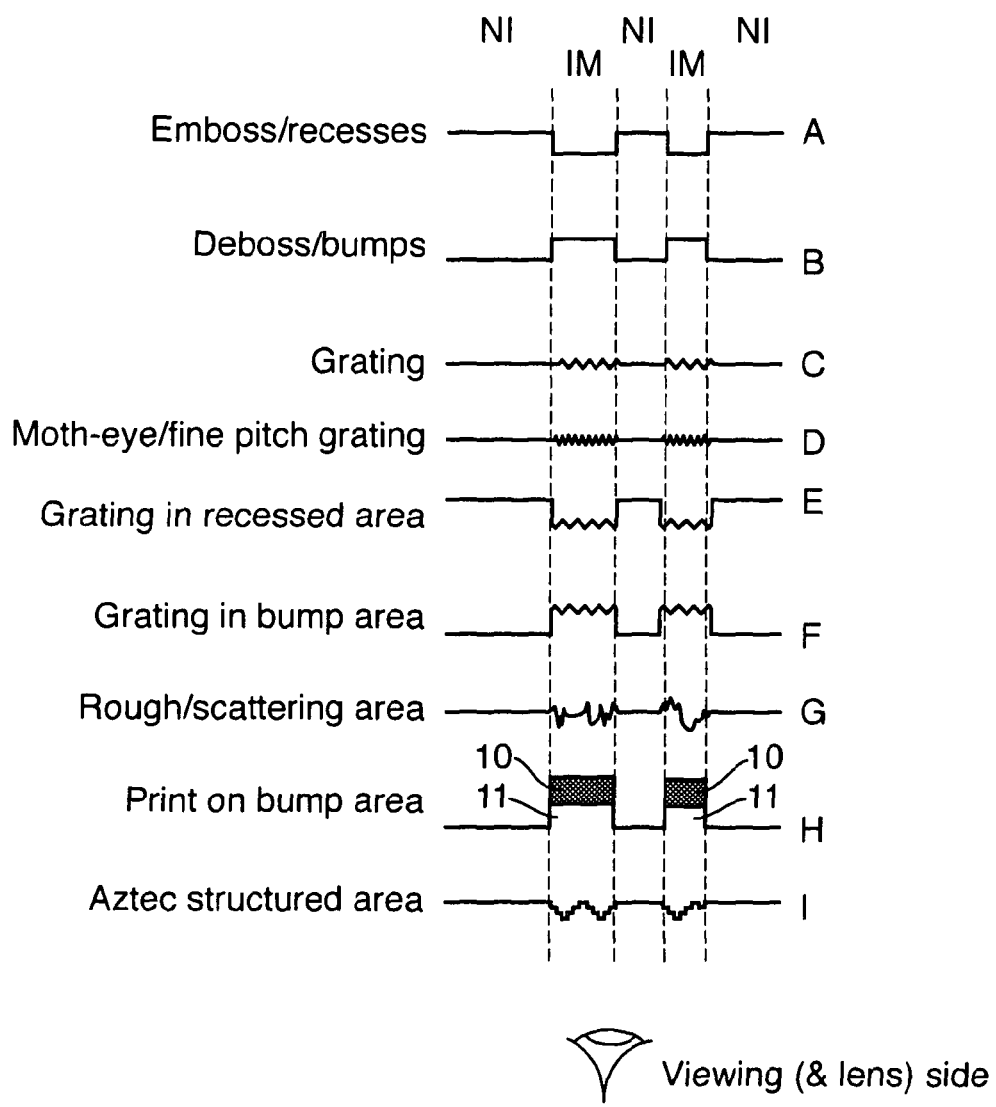
FIGS. 4A-4I illustrate different examples of relief structures defining image strips according to the invention.

In a lenticular device, the strips are arranged as slices or segments of an image e.g strips A,B etc where A and B represent either different images or different views of the same image. Each individual strip will comprise image and non-image areas. In the known lenticular devices the image regions of the strips are printed onto the substrate or carrier layer 4. In the present invention, however, the image regions of the strips are formed as a relief structure and a variety of different relief structures suitable for this are shown in FIG. 4.

Thus, FIG. 4A illustrates image regions of the strips (IM) in the form of embossed or recessed lines while the non-embossed lines correspond to the non-imaged regions of the strips (NI). FIG. 4B illustrates image regions of the strips in the form of debossed lines or bumps.

In another approach, the relief structures can be in the form of diffraction gratings (FIG. 4C) or moth-eye/fine pitch gratings (FIG. 4D).

The recesses or bumps of FIGS. 4A and 4B can be further provided with gratings as shown in FIGS. 4E and 4F respectively.

FIG. 4G illustrates the use of a simple scattering structure providing an achromatic effect.

Further, as explained above, in some cases the recesses of FIG. 4A could be provided with an ink or the debossed regions or bumps could be provided with an ink. The latter is a particularly important feature of the first aspect of the invention and is shown in FIG. 4H where ink layers 10 are provided on bumps 11.

FIG. 4I illustrates the use of an Aztec structure.

Additionally, image and non-image areas could be defined by combinations of different elements types, e.g. the image areas could be formed from moth-eye structures whilst the non-image areas could be formed from a grating. Or even the image and non-image areas could be formed by gratings of different pitch or orientation.

The height or depth of the bumps/recesses is preferably in the range 0.5-10 μm and more preferably in the range 1-5 μm. Typical widths of the bumps/recesses will be defined by the nature of the artwork but would typically be less than 100 μm, more preferably less than 50 μm and even more preferably less than 25 microns. The width of the image strip and therefore the width of the bumps or recesses will be dependent on the type of optical effect required for example if the diameter of the focussing elements is 30 μm then a simple switch effects between two views A and B could be achieved using 15 μm wide image strips. Alternatively for a smooth animation effect it is preferable to have as many views as possible typically at least three but ideally as many as 30, in this case the width of the image strips (and associated bumps or recesses) should be in the range 0.1-6 μm.

These lenticular devices according to the invention can be used to form labels which are then adhered to an article such as a document of value to provide security. In other cases, however, the security device can be integrally formed with the article. Thus, the carrier 4 shown in FIG. 2 could in fact be the substrate of an article of value such as a banknote or ID card. The portion of the substrate provided with the security device needs to be transparent and therefore could be a transparent window or other transparent region in the article.

In other examples, the security device could be in the form of a security thread or strip as will be described later.

Figure 6A:
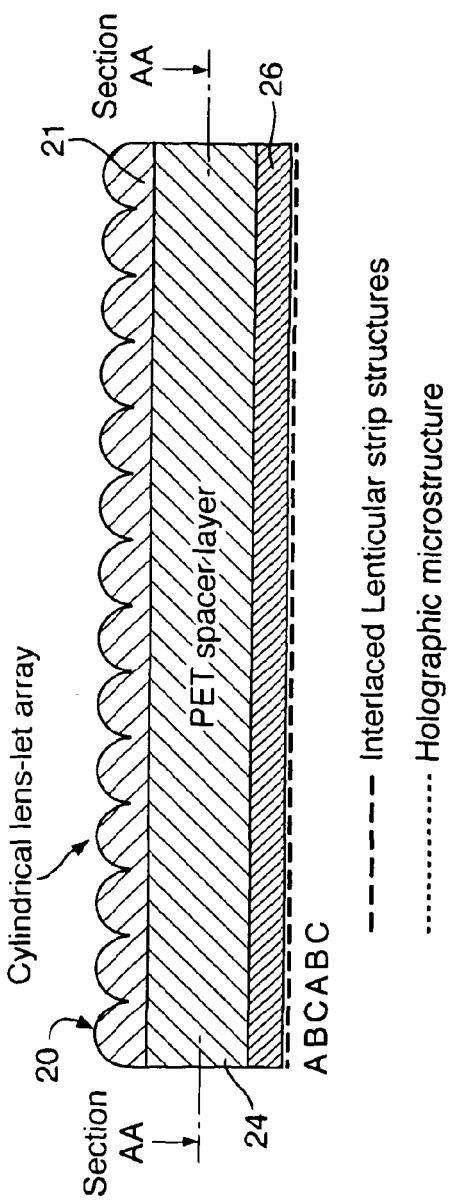
FIGS. 6A and 6B illustrate sections on the lines A-A and B-B respectively in FIG. 5A.
Figure 6B:
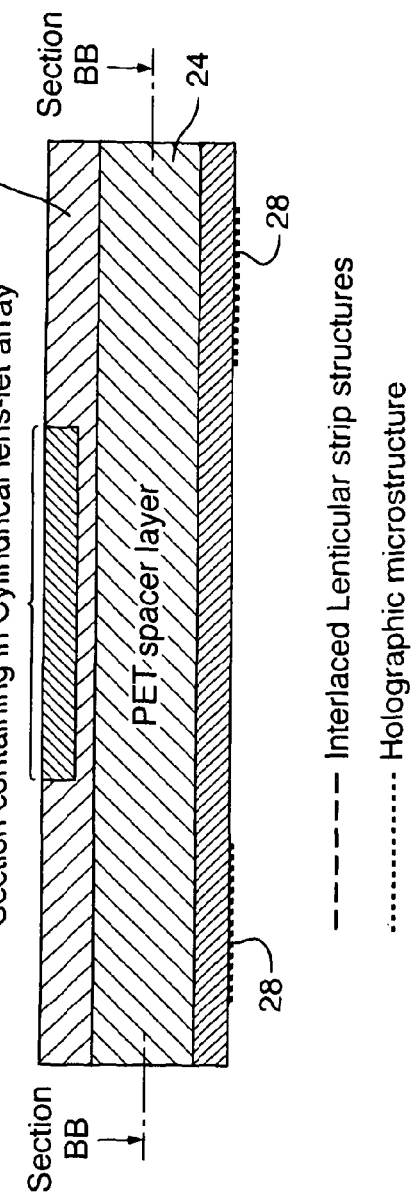

In particularly preferred examples, the security device also includes one or more other optical security features. An example of this is shown in FIGS. 5 and 6. In this example, a lenticular device 27 is formed by a sequence of cylindrical lenses 20 located in a line extending centrally across the security device, which in this case is a label 22. The microlenses 20 are embossed or cast-cured into a resin or polymer layer 21 and are formed on a substrate 24 or transparent polymeric spacer layer on which is also provided a transparent lacquer layer 26 into which sets of image strips A-C are embossed in register with the cylindrical lenses 20. The layer 24 is a supporting or substrate layer made of a transparent polymer such as biaxial PET or biaxial polypropylene. The thickness of this supporting layer 24 will depend upon the focal length of the lenses 20 but will typically be in the range 6-50 microns. The thickness of the polymeric layer 21 will typically be in the range 1-100 µm, more preferably 1-50 µm and even more preferably 5-30 µm.

In addition to the lenticular device 27 shown in FIGS. 5 and 6, the security device 22 includes a number of holographic image generating structures 28 embossed into the lacquer layer 26, as an example of the second aspect of the invention.

The image strips A-C associated with the lenticular structure 27 are arranged so as to give the appearance of moving chevron images 30,32 as the device is tilted about the axis B-B in FIG. 5A. This provides a primary security effect due to the lenticular animation. In addition to this, however, the holographic generating structures 28 cause the generation of holographic images which exhibit strong attractive and distinctive colour changes. It should be noted that although FIG. 5A only shows three image strips, this is for ease of illustration only and it is preferable to have more image strips especially when creating a movement effect.

The holographic generating structures 28 can be in the form of holograms or DOVID image elements. In the label construction 22 shown in FIG. 5A, the lenticular device 26 is located in a central horizontal band or region of the label whilst the holographic generating structures 28 are located on either side. However, it should be understood that this example is purely illustrative and for example the holographic generating structures 28 could be located in a central band or strip and the lenticular device being provided in one or more regions on either side. Alternatively the image provided by the lenticular device and the image provided by the holographic generating structures could be integrated into a single image by each providing components of a single image. FIG. 5b illustrates an example of such an integrated design where the holographic generating structures form a scroll 170 and in the middle of the scroll the holographic structures are replaced with the relief structures used in the lenticular image 180 to create a strong lenticular animation in this case of moving chevrons in the middle of the scroll.

In the examples in FIG. 5 it should be appreciated that the lenticular animation occurs only when the security device is tilted around an axis which is perpendicular to the direction the cylindrical lens-lets 20 exhibit their periodic variations in curvature. In this case the lenticular animation of the chevrons will occur along the line A-A when the device is tilted around the line B-B.

Conversely if the cylindrical lens system and associated image strips are rotated by 90 degrees then the lenticular animation occurs only when the security device is tilted around the line A-A. The animation itself can take place in any direction and is purely dependent on the artwork.

In a preferred embodiment the cylindrical microlens array and the microimage strips are arranged such that the direction the cylindrical lens-lets exhibit their periodic variations in curvature lies at 45 degrees to the x-axis (line A-A in FIG. 5A) or y-axis (line B-B in FIG. 5A) or any angle in between which may be deemed advantageous. In some devices the 45 degree angle is particularly advantageous—since documents tend to be tilted only north-south or east-west, the device can appear to move with all tilts. An additional security benefit is that the conventional thick lenticular devices are only made with the lenticular in a north-south or east-west orientation which provide an additional defence against a crude, thick counterfeit.

A particular advantage of the example as just described is that the image strips A-C and the surface relief forming the holographic image generating structures 28 are each embossed into the same substrate leading to a particularly convenient manufacturing process and the ability to achieve exact register between the image strips and holographic image generating structures.

FIG. 7 illustrates an example lenticular device comprising four image strips A-D which are different views of the same image in order to create a lenticular animation effect. In this example the image areas of the strips are creating by creating a series of raised regions or bumps in a resin layer 26 provided on a PET spacer layer 24. A resin layer 21 is provided on the opposite surface of the layer 24 into which a lens array 20 is embossed or cast cured. A coloured ink is then transferred onto the raised regions typically using a lithographic, flexographic or gravure process. In the example shown in FIG. 7 image strips A and B are printed with one colour 27 and image strips C and D are printed with a second colour 28. In this manner when the device is tilted to create the lenticular animation effect the image will also be seen to change colour as the observer moves from view B to view C. In a different example all of the strips A-D in one region of the device would be one colour and then all a different colour in a second region of the device. Alternatively images strips A,B,C and D could all be different colours.

In a further embodiment image strips A could represent a multicoloured version of one view of the image and image strips C-D could each represent a differently coloured multicoloured version of the same image.

Preferably the relief structures suitable for inking are not highly reflective and are not structures which prior to being inked will give differing chrominance/luminance since that will confuse the viewer from the printed ink colours. The advantage of raised inked structures when compared to non-inked diffractive relief structures is that coloured inks structures provide an enhanced contrast with both the non-inked regions and other differently coloured inked regions. The visibility of the images formed by the raised-ink structures will not significantly change under different lighting conditions. This is contrast to diffractive structures where visibility will be significantly reduced in poor lighting conditions. Furthermore the colours and the opacity of the inks are easily controllable using conventional ink production techniques. In contrast the use of diffraction gratings is more complex and expensive to generate and in practice gratings require multiple periods to diffract effectively and it would therefore be difficult to provide a strong coloured effect over the width of an image strip.

In a further embodiment when the image elements of the strips are formed from diffraction gratings then different image elements within one strip or in different strips can be formed by different gratings. The difference may be in the pitch of the grating or rotation. This can be used to achieve a multicoloured diffractive image which will also exhibit a lenticular optical effect such as an animation. For example if the image strips creating the chevrons in the example illustrated in FIG. 5 had been created by writing different diffraction tracks for each strip then as the device in FIG. 5 is tilted around the line B-B lenticular animation of the chevrons will occur during which the colour of the chevrons will progressively change due to the different diffraction gratings. A preferred method for writing such a grating would be to use electron beam writing techniques or dot matrix techniques.

Figure 8:
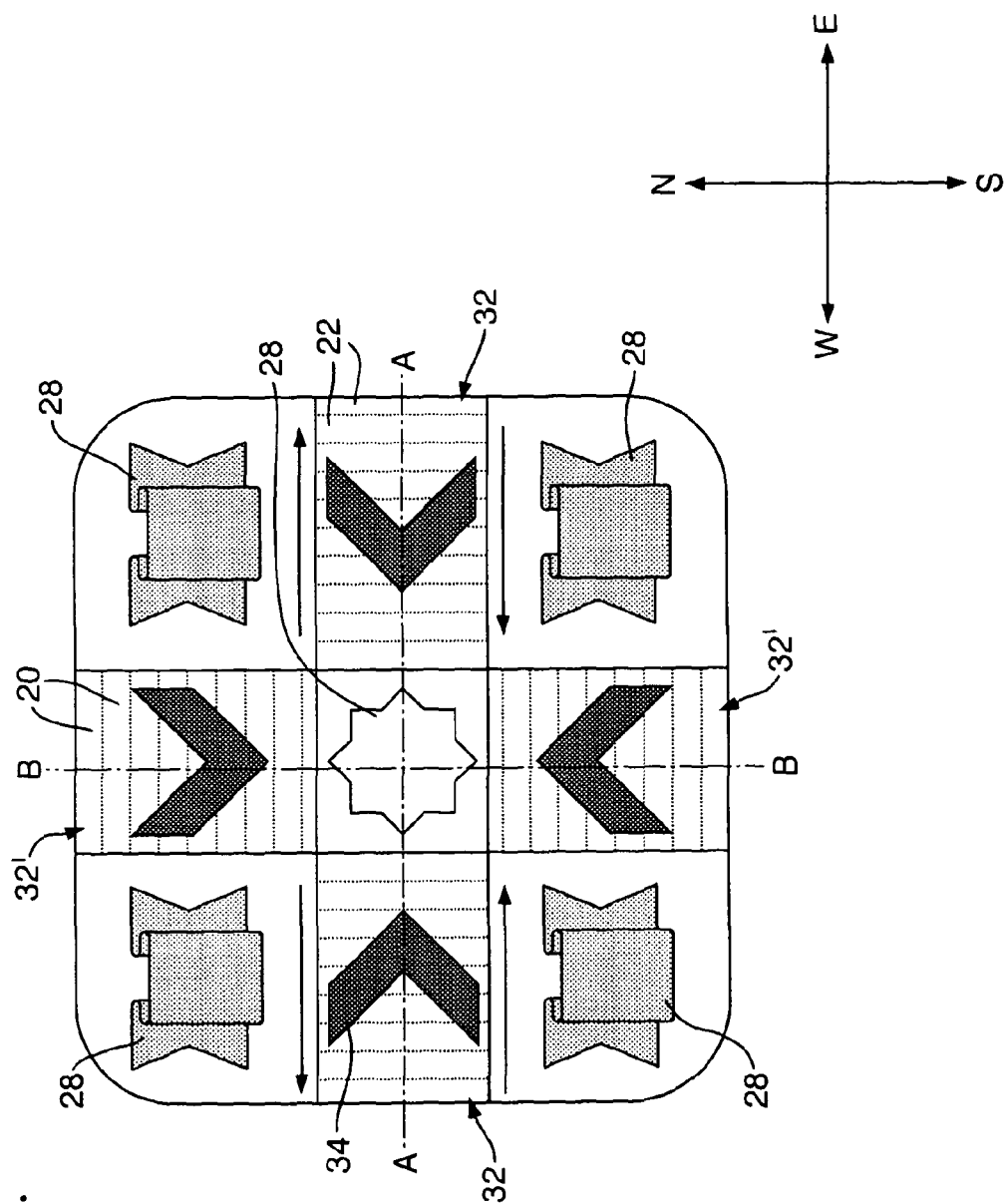
FIG. 8 is a plan view of a second example of a security device according to the invention.

FIG. 8 illustrates a further arrangement, similar to FIG. 5A, in which there are two sets of cylindrical microlens 20 arrays which are oriented at 90° to each other. In this embodiment lenticular devices 32 which, on east-west tilting, provide images of chevrons 34 moving towards and away from each other along line A-A and lenticular devices 32' which, on north-south tilting, provide images of chevrons moving towards and away from each other along line B-B. In addition five surface relief holographic generating structures 28 are located in the spaces defined between the lenticular devices.

In the case of the holographic structures 28, these can have any conventional form and can be fully or partially metallised. Alternatively the reflection enhancing metallised layer can be replaced with a substantially transparent inorganic high refractive index layer.

Whatever arrangement is defined, it is advantageous if the individual regions allocated to the holographic or lenticular devices are sufficiently large to facilitate clear visualisation of the respective holographic and lenticular animation effects.

Figure 20:
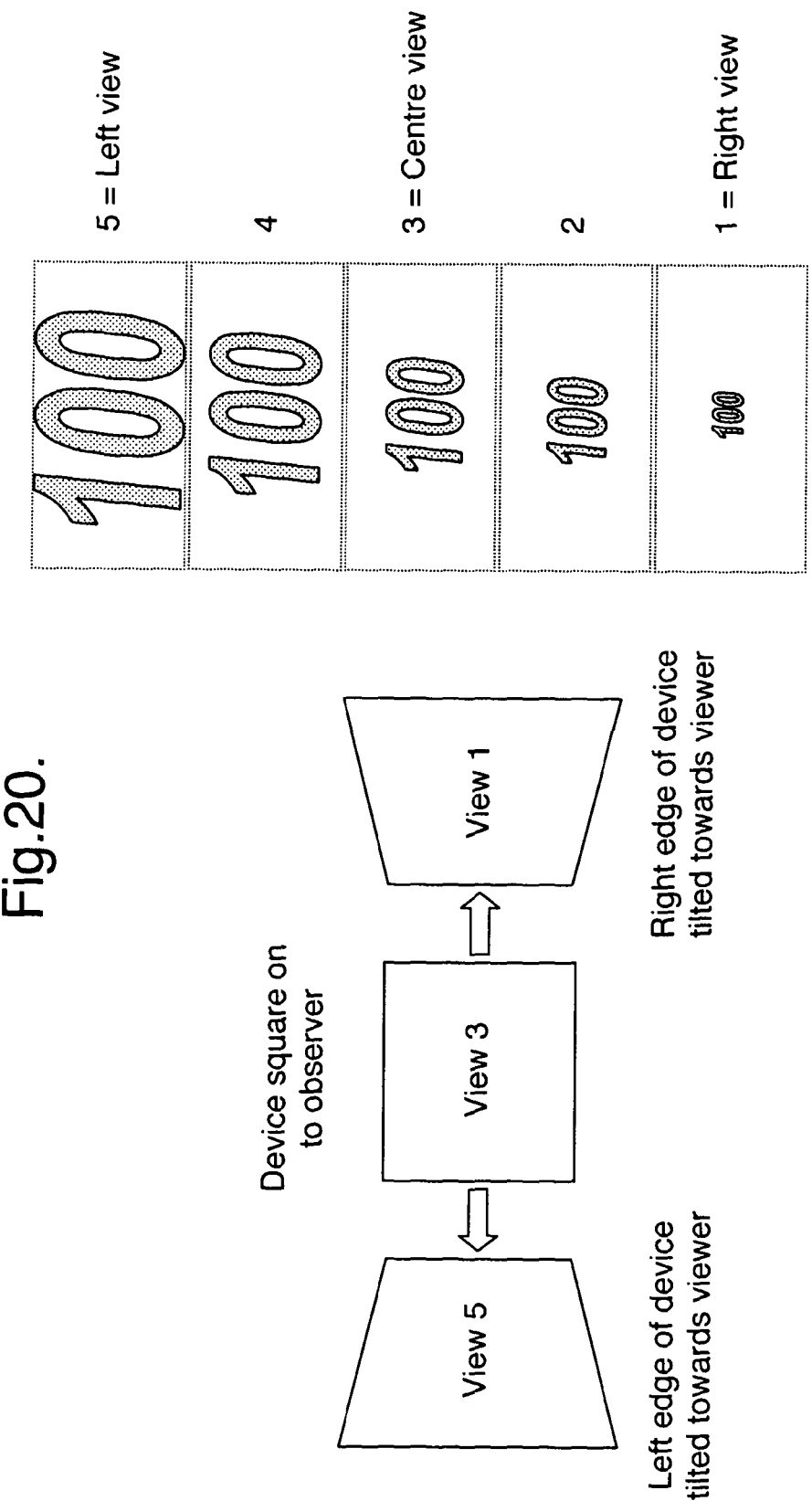
Figure 21:
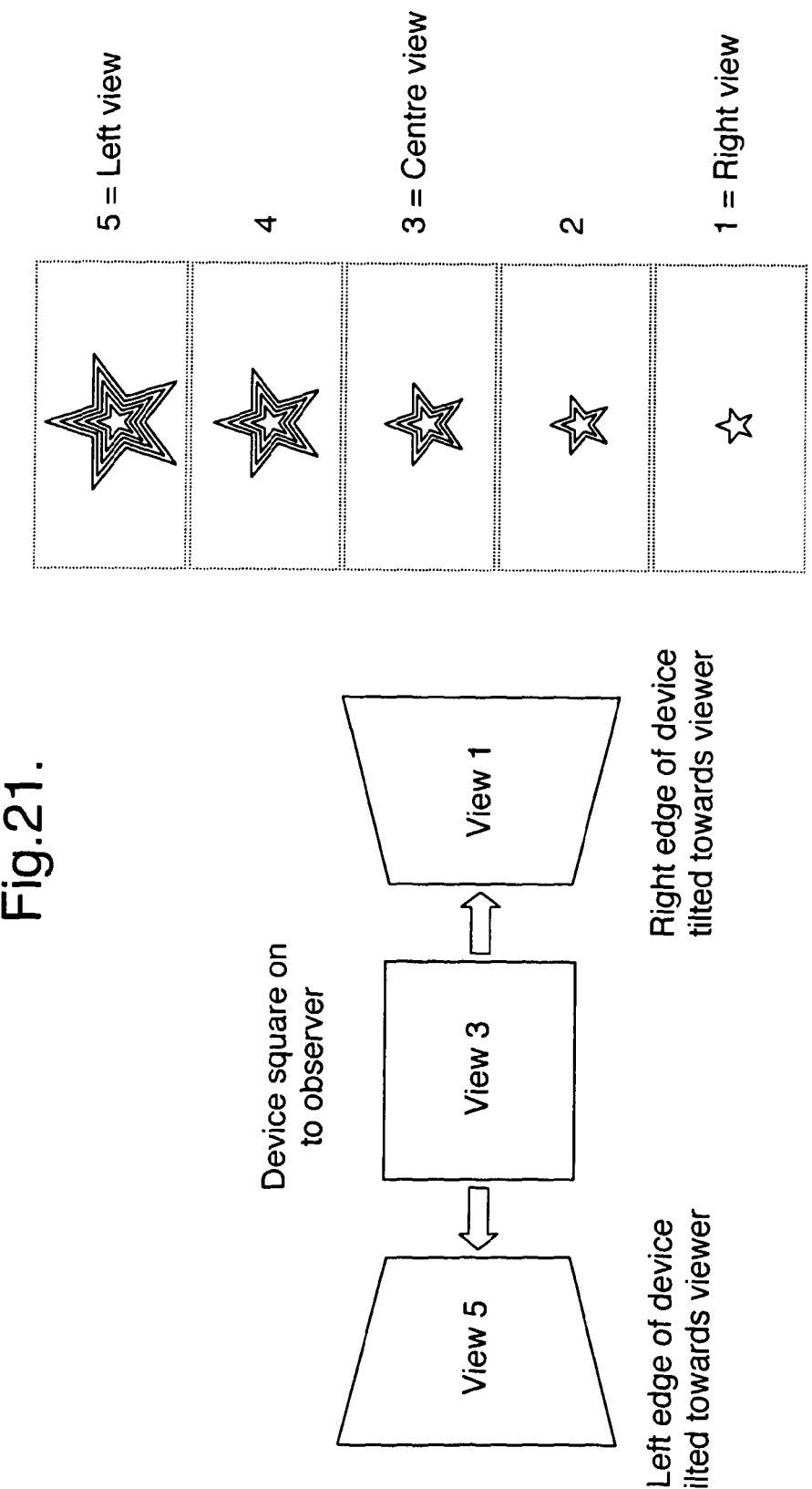

Of course, although the lenticular devices are described as providing animation effects, they could also provide other effects such as image morphing or image switching and the like. Examples of the different types of effects are illustrated in FIGS. 20, 21 and 22. FIG. 20 shows a device where the different views represent different sizes of the same image, in this case the numeral 100, such that the image is observed to progressively increase in size on tilting (zoom effect). FIG. 21 illustrates a further variant in this case a star is seen to expand as the device is tilted through the different views (expansion effects). FIG. 22 illustrates an example of a switching device in which a dollar sign in a first colour and numerals '40' in a second colour reverse in colour as the device is tilted (switch effect). The zoom and expansion effects can of course be further enhanced by the image changing colour through the use of raised inked structures.

The security devices shown in FIGS. 5-8 are suitable to be applied as labels which will typically require the application of a heat or pressure sensitive adhesive to the outer surface containing the relief structures. In addition an optional protective coating/varnish could be applied to the outer surface containing the cylindrical lenses. The function of the protective coating/varnish is to increase the durability of the device during transfer onto the security substrate and in circulation. The protective coating must have a significantly lower refractive index than the refractive index of the cylindrical lenses.

Figure 9:
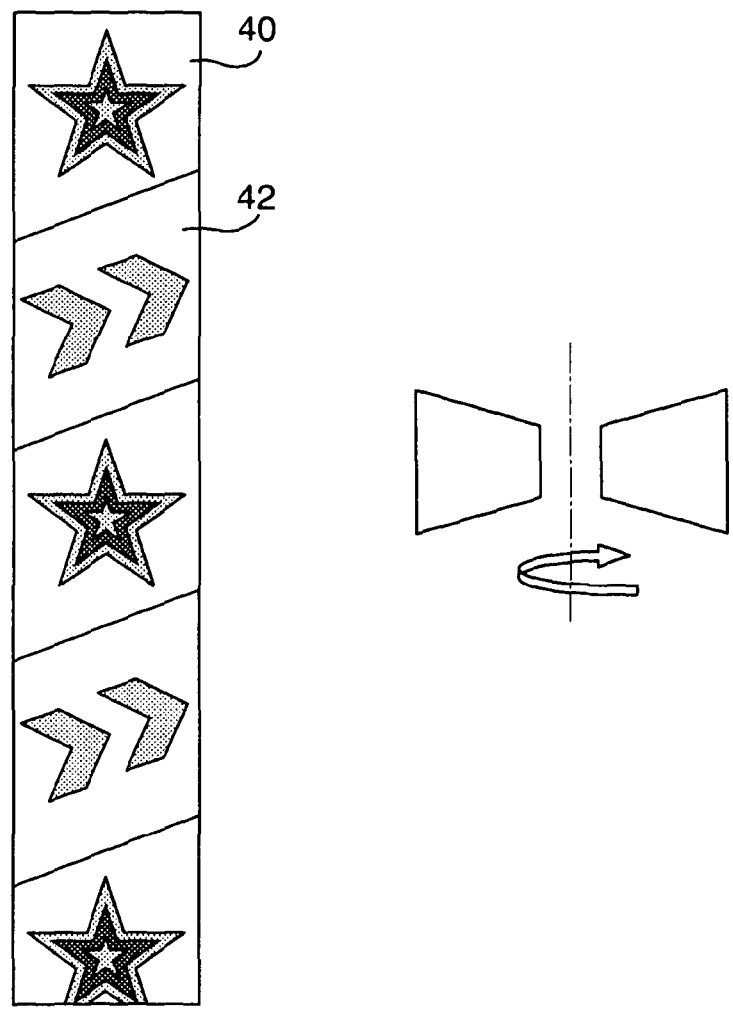
FIG. 9 illustrates a third example of a security device according to the invention in the form of a security strip.

In the case of a transfer element rather than a label the security device is preferably prefabricated on a carrier substrate and transferred to the substrate in a subsequent working step. The security device can be applied to the document using an adhesive layer. The adhesive layer is applied either to the security device or the surface of the secure document to which the device is to be applied. After transfer the carrier strip can be removed leaving the security device as the exposed layer or alternatively the carrier layer can remain as part of the structure acting as an outer protective layer. A suitable method for transferring security devices based on cast cure devices comprising micro-optical structures is described in EP1897700, FIG. 9 illustrates a security device in the form of a security strip or thread. Security threads are now present in many of the world's currencies as well as vouchers, passports, travellers' cheques and other documents. In many cases the thread is provided in a partially embedded or windowed fashion where the thread appears to weave in and out of the paper. One method for producing paper with so-called windowed threads can be found in EP0059056. EP0860298 and WO03095188 describe different approaches for the embedding of wider partially exposed threads into a paper substrate. Wide threads, typically with a width of 2-6 mm, are particularly useful as the additional exposed area allows for better use of optically variable devices such as the current invention. The device structure shown in FIG. 5 could be used as a thread by the application of a layer of transparent colourless adhesive to the outer surface containing the microlens array and/or the microimage array.

Careful selection of the optical properties of the adhesive in contact with the microlenses is important. The adhesive must have a lower refractive index than the microlens material and the greater the difference in the refractive index between the microlenses and the adhesive the shorter the back focal length of the lenses and therefore the thinner the final security device.

The thread or strip in FIG. 9 comprises alternating holographic and lenticular devices 40,42 made in a similar manner to previous examples. For example, both the holographic and lenticular devices could be defined by surface relief structures while the image strips of the lenticular devices could be defined by embossed features carrying ink. Within this design the expanding stars represent the hologram elements and the chevrons represent the lenticular animation. When the thread is rotated about its elongate axis, the lenticular device 42 illustrates an image motion effect, whereas the stars could be recorded to expand from small to large on horizontal tilting and change colour on vertical tilting and the chevrons move in a diagonal direction across the thread.

In an alternative embodiment to that shown in FIG. 9 the spatially separate lenticular regions could exhibit different optical effects for example one set could exhibit image switching and one set could exhibit a lenticular animation effect.

In other examples (not shown), one or more of the holographic generating structures could be replaced by moiré magnification structures which could be either 2-dimensional (2D) or 1-dimensional (1D) structures. 2D moiré magnification structures are described in more detail in EP-A-1695121 and WO-A-94/27254. A moiré magnification device is constructed through a combination of microlenses and microimages. In the simplest case of a small pitch mismatch between the lens arrays and image arrays, an array of magnified images of constant magnification is observed with motion resulting from the normal parallax of a lens. In a 1D moiré magnification structure the 2D spherical lens array used in a conventional 2D moiré magnification structure is replaced with a repeating arrangement of cylindrical lens-lets. The result of this is that the micro-image elements are subject to moiré magnification in one axis only which is the axis along which the lenses exhibit their periodic variations in curvature or relief. Consequently the micro-images are strongly compressed or de-magnified along the magnification axis whilst the size or dimension of the micro image elements along the axis orthogonal to the magnification axis is substantially the same as they appear to the observer—i.e. no magnification or enlargement takes place. The microimages could be printed or formed as relief structures with or without ink.

For example, and with reference to FIG. 10, consider a very simple scenario wherein we require the moiré magnified image to be comprised of an array of circles 2 mm in diameter. Further suppose we arrange the periodicity and alignment of the micro image array relative to the micro-lens array to provide a moiré magnification of ×50. If for convenience we choose the axis of lens curvature of the lenses to be the x-axis it then follows that the micro image array will be comprised of a matrix of elliptical image elements wherein the minor axis of the ellipse (coinciding with the x-axis) will have a width of 0.04 mm and a height of 2 mm.

It should be appreciated that in a 1-D moiré system parallactic motion occurs only along the axis in which the cylindrical lens-lets exhibit their periodic variations in curvature. Thus in the example just described, parallax motion of the circular images (as well as magnification) will occur along the x-axis on east-west tilting of the device. It should be noted that on north-south tilting of the device no parallax motion will be exhibited. Conversely if the cylindrical lens system and micro-image array are rotated by 90 degrees then parallax motion will take place along the y-axis on north south tilting of the device.

It is of course possible to arrange the microlens array and microimage array such that the axis of parallax lies at 45 degrees to the x or y-axis or any angle in between which may be deemed advantageous.

The combination of a 1D moiré magnification device with a lenticular structure is particularly advantageous because they both comprise a lenticular lens array and therefore the same lens array can be used for both regions of the device. In a typical example combination of a lenticular structure with a 1D moire magnification structure the lenticular structure could exhibit a simple image switch and the 1D moiré magnifier will exhibit a parallax motion effect.

Some examples of methods for manufacturing the devices described above will now be described. In the first example (FIG. 11), a carrier layer 24 such as a PET layer is coated with a cast-cure or thermoforming resin 21 (step 1). This resin 21 is then (step 2) cast or embossed into a cylindrical lens array 20.

The other side of the carrier 24 is then coated with a cast-cure or thermoforming resin 26 (step 3) and recesses 50 corresponding to the image elements in strips A and B are formed by casting or embossing in the resin layer (step 4) in register with the lenses 20.

For example a roll of clear polymeric film of PET or the like 24 is coated on its first surface with a layer of UV curable polymer 21. Suitable UV curable polymers include photopolymer NOA61 available from Norland Products, Inc. New Jersey, Xymara OVD primer from Ciba or UV9206 from Akzo-Nobel. The film is then brought into contact with the first embossing roller that contains the negative of a master structure for the microlens array 20. On contacting the embossing roller the microlens array structure 20 is replicated in the UV curable polymer layer 21. Once the structure is replicated the UV curable polymer layer is cured by application of UV radiation and the coated film is then released from the embossing roller. A layer of UV curable polymer 26 such as NOA61 is then coated onto the opposite second surface of the film 24. The second surface of the film 24 is then brought into contact with a second embossing roller that contains the negative of a master structure for the image elements of the image strips. On contacting the embossing roller the image structure is replicated in the UV curable polymer layer on the second surface of the clear polymeric film. Once the structure is replicated the UV curable polymer layer is cured by application of UV radiation and the coated film is then released from the embossing roller.

A uniform pigmented or dyed coating is applied to the embossed surface of the layer 26 using a first opaque colorant 52 such as pigmented version of the casting resins above or for example a gravure ink such as 60473G from Luminescence which will fill the recesses 50 and provide a coating over the entire layer 26 (step 5). The coating method is typically by gravure, litho or flexographic printing or by using an anilox roller.

In step 6, excess first colorant 52 is removed using a doctor blade process so as to leave the first colorant only in the recesses 50 which form the image elements within the strips.

Optionally in step 7, a second colorant 54 in the form of a pigmented or dyed coating such as pigmented version of the casting resins above or for example a gravure ink such as 60473G from Luminescence is coated over the resin layer 26 typically using a litho, flexographic or gravure process so that in the non-image regions of the strip the second colorant 54 will be visible through the lenses 20 while in the image regions first colorant 52 will be visible. The observer will therefore see a coloured image against a differently coloured background. It should be noted that the lenticular device in FIG. 11 is a simple switching device with only two image strips present under each lens and of course the same method can be used for lenticular devices comprising more image strips which would be needed to provide the lenticular animation effects.

FIG. 12 illustrates a modified form of the method. In this case, steps 1-4 are as previously described with reference to FIG. 11. However, in step 5A, instead of step 5, a first colorant 52 is transferred onto the raised (non-recessed) linear regions of the layer 26 which form the image elements within the strips using an offset transfer method from an anilox roller or litho blanket, or by litho, flexographic or gravure printing.

In a variant, the overall inking is built up from different colours in different areas of the device such that some elements are inked with blue say whereas other elements are inked with a red ink. Ideally, this colour pattern is built up on one transfer roller before transferred all at once onto the relief structure. This simultaneous transfer allowing perfect register of the colours to each other.

An additional non-essential step is step 6A where, instead of step 6, a second colorant 54 is uniformly coated onto the layer 26 so that it also fills the recesses 50 (step 6A). This can be carried out using a gravure or offset litho process, etc. In this case, the second colorant 50 will define the image elements and the first colorant 52 will define the non-image elements and therefore form the coloured background region.

It will readily be understood that the methods described above relate solely to the lenticular device. When a lenticular device is to be combined with another relief structure such as a hologram or the like then the surface relief defining that device will be also embossed into the layer 26.

FIG. 13 illustrates an alternative method in which the image strips are formed by diffractive surface reliefs.

In step 1, a carrier layer 24 is coated with cast-cure or thermoforming resin layer 26 (step 1).

Strips A and B, representing views A and B of a lenticular switching device, comprise image and non-image regions. In Strips A the image regions are defined by one grating structure X and in Strips B the image regions are defined by a second different grating structure Y. The grating structures X,Y which have been previously originated are then simultaneously formed by embossing into the exposed surfaces of the resin layer 26 (step 2). The use of two different grating structures for the image regions of A and B provides a visual contrast due to the different diffractive colour effects. This difference is not essential and the image regions could be defined by the same diffractive grating structure. The non-image regions could also be defined by a grating structure which is different to that of the image regions. The grating structures could differ for example by rotation and pitch.

A reflection coating layer 60 is then provided over the grating surface relief structure (step 3). This reflection coating can be a metallisation or a high refractive index layer. The use of high refractive index materials, typically inorganic, are well known in the art and described in U.S. Pat. No. 4,856,857. Typical examples of materials suitable for the high refractive index layer include zinc sulphide, titanium dioxide & zirconium dioxide. Replacing the vapour deposited metal reflection enhancing layer with a transparent hri layer is particularly beneficial when the security device of the current invention is applied over transparent regions (typically known as apertures or windows) of secure documents.

The other side of the carrier layer 24 is then coated with a cast-cure or thermoforming resin 21 (step 4) and then a set of cylindrical lenses 20 are embossed into the layer 21 (step 5) so as to be in register with the strips A and B.

There are a number of ways in which the embossing steps can be achieved.

Figure 14:
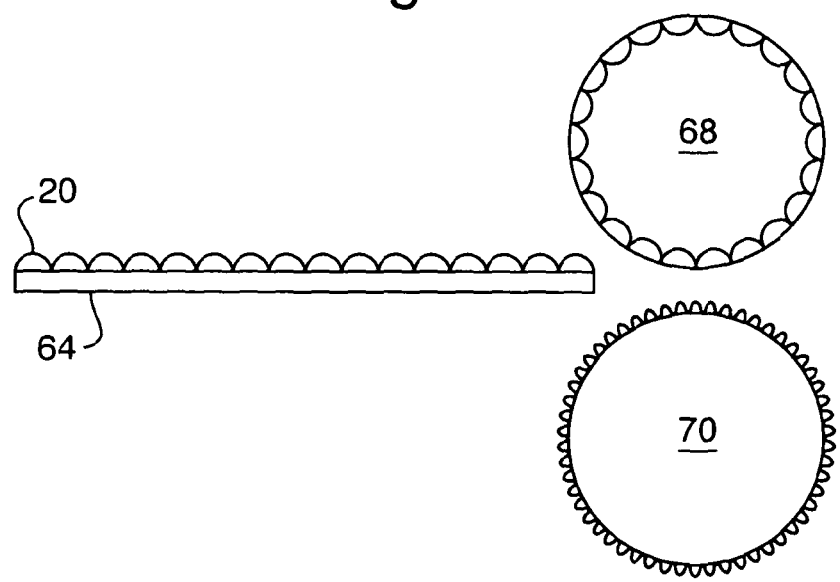
FIG. 14 illustrates schematically part of apparatus for manufacturing a security device according to the invention.

In FIG. 14, a substrate 64 comprising layers 21,24,26 has already been provided with cylindrical lenses 20. It is then passed between two rollers 68,70. The roller 68 has a surface which is complementary to the lenses 20 so that each lens 20 will be received in a corresponding recess in the surface of the roller 68. The roller 70 has a surface which is complementary to the relief structure which is to be embossed into the layer 26. This surface will typically be irregular although it is shown as a regular relief for simplicity. The recesses in the roller 68 then ensure that the substrate 64 is correctly located relative to the surface of the roller 70.

Figure 15:
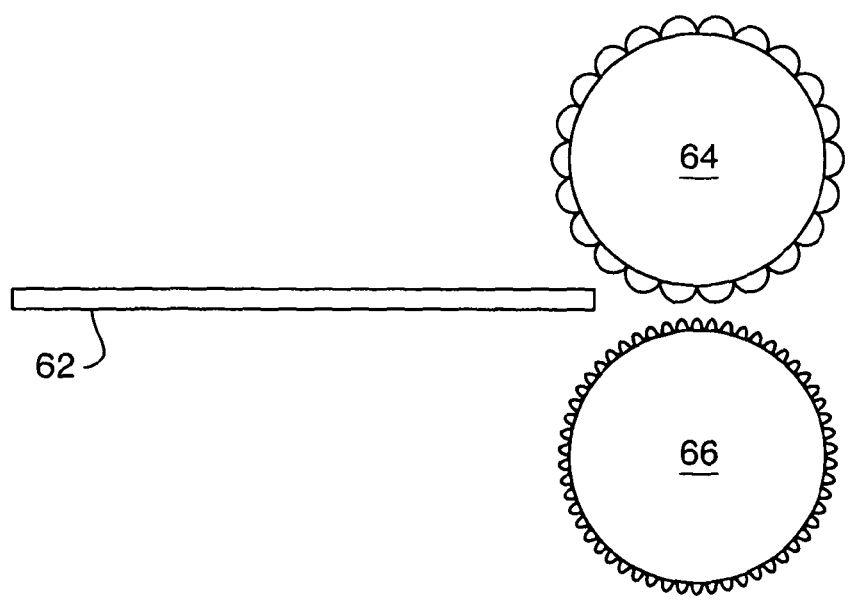
FIG. 15 illustrates schematically a second example of part of apparatus for manufacturing a security device according to the invention.

FIG. 15 illustrates an alternative example in which the substrate, shown generally at 62 (and equivalent to layers 21,24,26 before any embossing), is fed between two embossing rollers 64,66. Embossing roller 64 has a surface which is complementary to the cylindrical lens set 20 which is to be embossed while the surface of the embossing roller 66 has a surface which is complementary to the relief structure which is to be embossed into the other side of the substrate 62. This surface will typically be irregular although it is shown as a regular relief for simplicity. With this arrangement, it can be ensured that there is registration between the cylindrical lenses 20 and the relief structure.

In the examples described so far, the cylindrical lenses have been used to provide focusing power. Other lenticular focusing elements could be used including micromirrors. There are some advantages to the use of micromirrors as will now be described.

Figure 16:
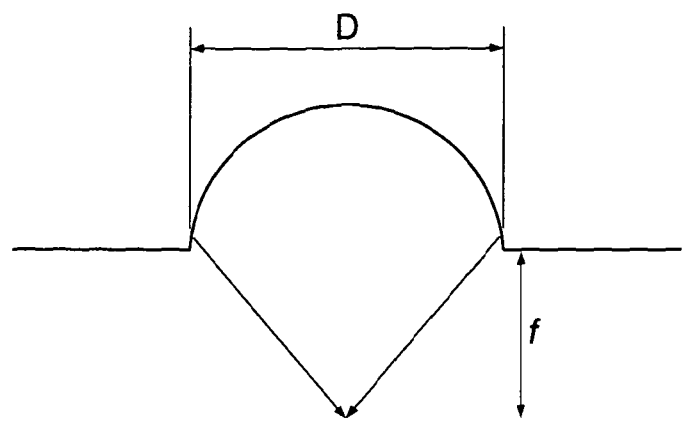
FIGS. 16 and 17 are optical diagrams illustrating the differences between a lens and a micromirror.

The back focal length of a lens, f, is (to a 1$^{st}$ approximation) restricted to being no shorter than the diameter, D (see FIG. 16).

Or mathematically:

$$f \geq D$$

Fundamentally, the limit is driven by the amount of deflection achievable by refraction according to Snell's law. The deflection possible is determined by the topology of the lens and refractive indices of the material(s). The lens topology determines what angle the edge of lens makes to the surface. The refraction imparted is determined the surface angle plus the refractive index difference between the lens and the air in front of it.

Figure 17:
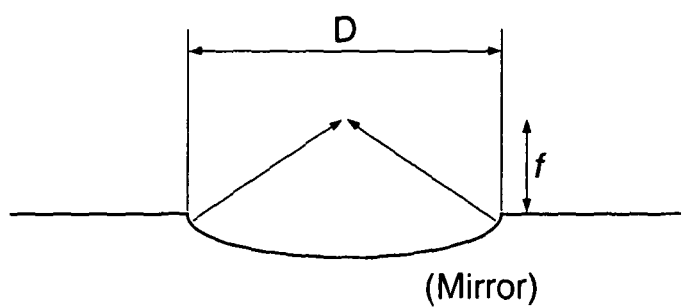

With a mirror, the deflection angle is not determined by Snell's law but by the law of reflection (angle of reflection equals angle of incidence). This is much more powerful than refraction—a curved mirror which at its edge forms an angle of 45° to the surface will deflect the light by 90° overall, i.e. parallel to the surface (FIG. 17).

For the mirrored surface: $f \geq 0$

There are other benefits:

The height (or depth) of mirror surface itself will be less for a given focal length Because the mirror is metallised, both the mirror and images can be overcoated with adhesive The fact that the focal length (and hence thickness) is not restricted by the diameter of the micro-mirror means that the lenticular device can have a thickness which is independent of the minimum printable line width. Thus, in practice, it is possible to combine conventional litho printing (200 um high characters) with a micro-mirror to make a lenticular device with a 30 um thickness.

Figure 18:
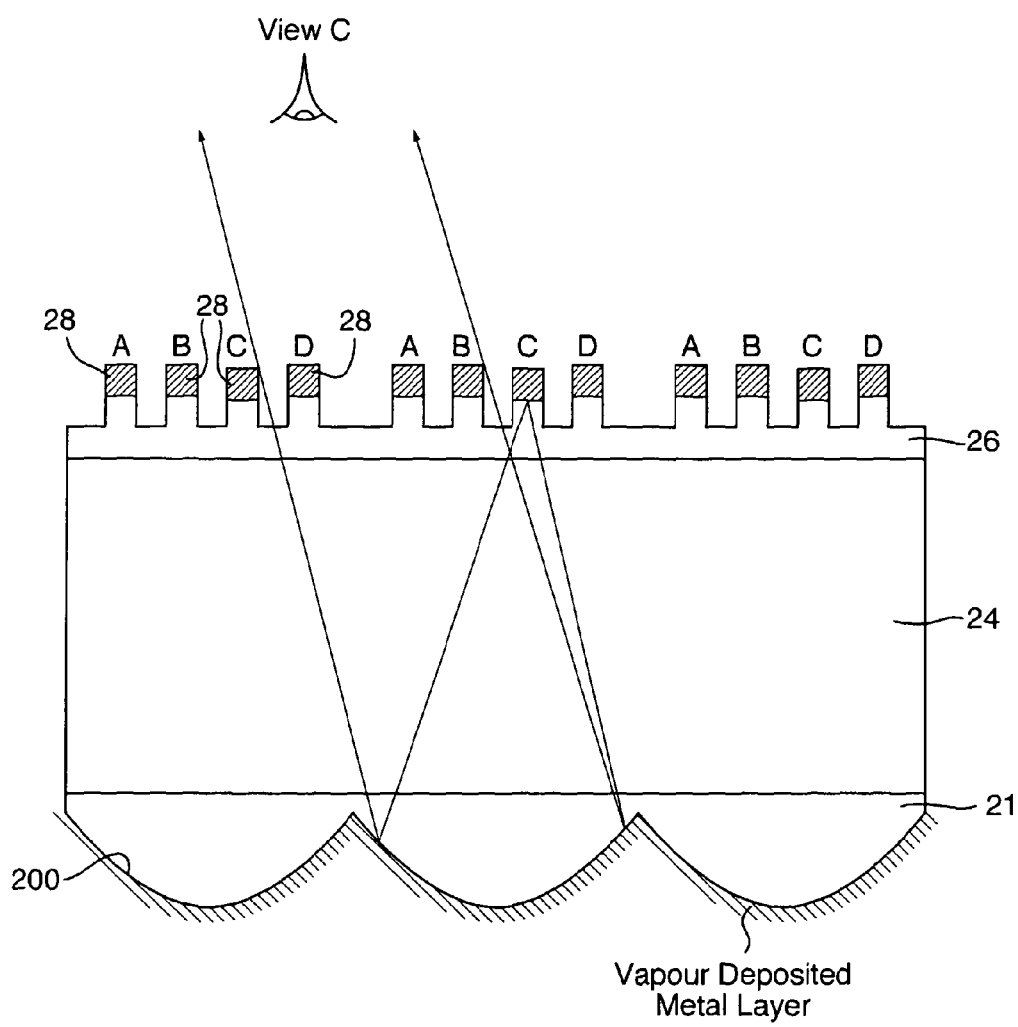
FIG. 18 is a view similar to FIG. 7 but utilizing micromirrors instead of cylindrical lenses.

FIG. 18 illustrates a typical cross-section of the security device based on the FIG. 7 example but using the same colour ink on each bump A-D but which utilises micro-mirrors as the focussing elements. In this example a series of micro-mirrors 200 are formed in thermoforming resin 21 by casting a set of cylindrical lenses as described previously and then vapour depositing a layer of metal on the back surface. The lenticular device comprises four image strips A-D formed on the top surface of the device where the image regions of these strips are creating by printing on raised regions (bumps).

The security device of the current invention can be made machine readable by the introduction of detectable materials in any of the layers or by the introduction of separate machine-readable layers. Detectable materials that react to an external stimulus include but are not limited to fluorescent, phosphorescent, infrared absorbing, thermochromic, photochromic, magnetic, electrochromic, conductive and piezochromic materials.

The security device of the current invention may also comprise additional security features such as any desired printed images, metallic layers which may be opaque, semitransparent or screened. Such metallic layers may contain negative or positive indicia created by known demetallisation processes.

Additional optically variable materials can be included in the security device such as thin film interference elements, liquid crystal material and photonic crystal materials. Such materials may be in the form of filmic layers or as pigmented materials suitable for application by printing.

Figure 19A:
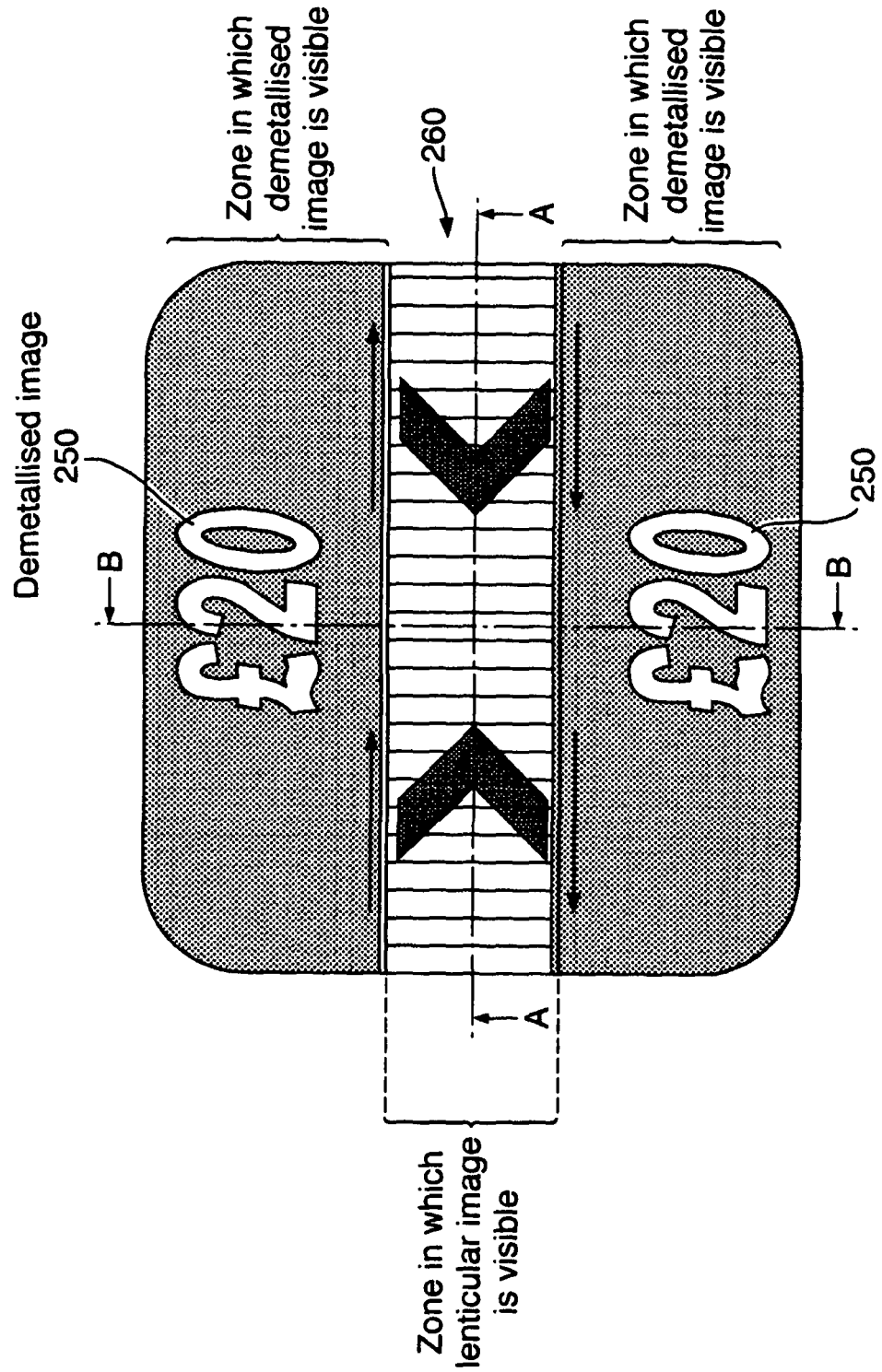
FIGS. 19a and 19b illustrate a further example of a security device according to the invention in plan and cross-sectional form respectively.
Figure 19B:
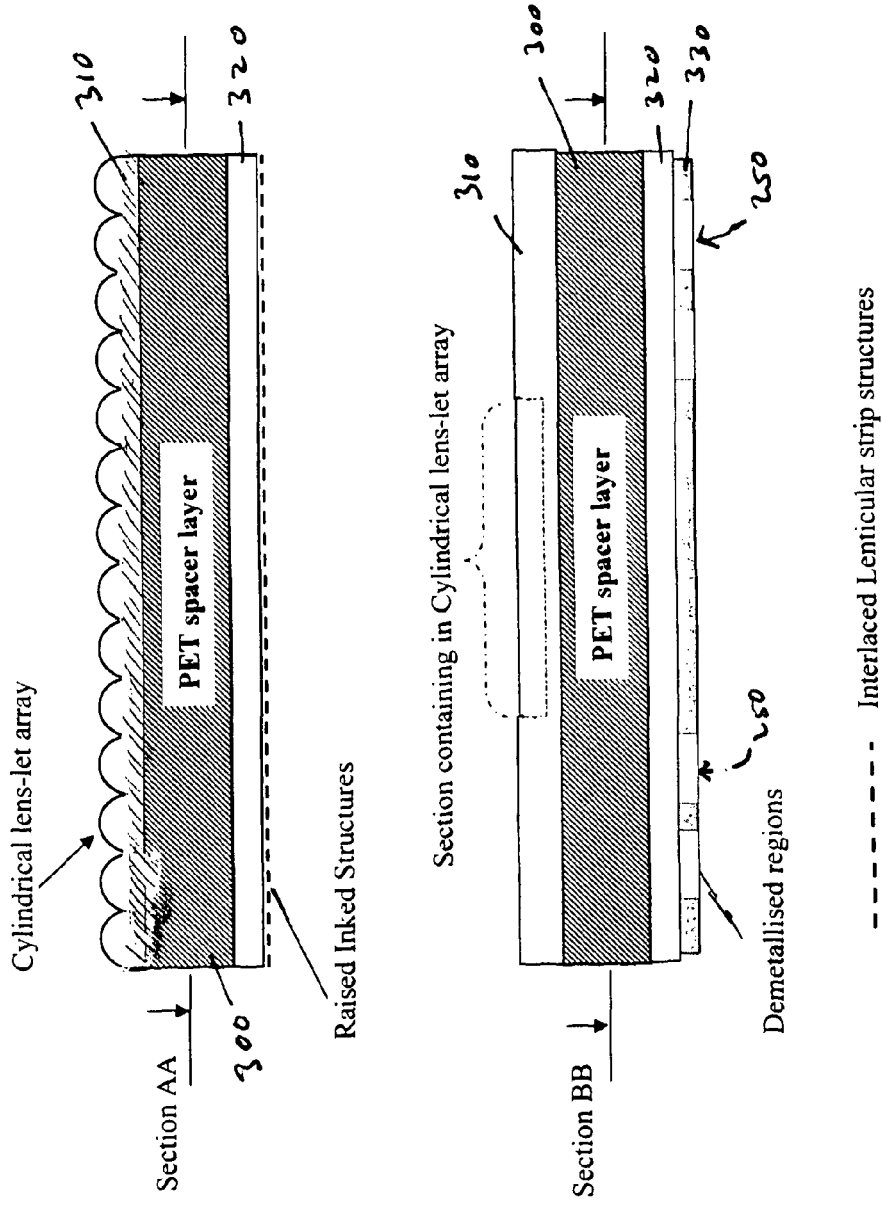

FIGS. 19a and b show a second security feature in the form of a demetallised image 250 incorporated within a security device of the current invention. The image strips associated with the lenticular structure 260 are formed from raised inked structures and arranged so as to give the appearance of moving chevron images as the device is tilted about the axis B-B in FIG. 19a. This provides a primary security effect due to the strong lenticular animation. As can be seen in FIG. 19b, the structure of the feature shown in FIG. 19a comprises a PET spacer layer 300 on the upper surface of which is provided a cylindrical lenslet array 310 forming part of the lenticular structure 260. This will have been formed by cast curing or embossing into a resin layer as in the previous examples.

The other surface of the layer 300 is provided with an embossing layer 320 into which has been embossed a relief structure defining the image strips of the lenticular structure 260. A coloured ink layer is applied onto the raised regions as described previously (not shown in the figure for simplicity). A metallic layer 330 is coated over the embossed structure. As can be seen in the section along B-B of FIG. 19b, parts of the metal layer 330 are demetallised to define the demetallised images 250.

The metallised layer is either not applied over the layer comprising the image forming relief structures or is subsequently removed using a known demetallisation process. The metallised layer allows the creation of demetallised indicia which can be viewed in reflective but more preferably transmitted light.

One way to produce partially metallised/demetallised films in which no metal is present in controlled and clearly defined areas, is to selectively demetallise regions using a resist and etch technique such as is described in U.S. Pat. No. 4,652,015. Other techniques for achieving similar effects are for example aluminium can be vacuum deposited through a mask, or aluminium can be selectively removed from a composite strip of a plastic carrier and aluminium using an excimer laser. The metallic regions may be alternatively provided by printing a metal effect ink having a metallic appearance such as Metalstar® inks sold by Eckart.

The presence of a metallic layer can be used to conceal the presence of a machine readable dark magnetic layer. When a magnetic material is incorporated into the device the magnetic material can be applied in any design but common examples include the use of magnetic tramlines or the use of magnetic blocks to form a coded structure. Suitable magnetic materials include iron oxide pigments ($Fe_2O_3$ or $Fe_3O_4$), barium or strontium ferrites, iron, nickel, cobalt and alloys of these. In this context the term "alloy" includes materials such as Nickel:Cobalt, Iron:Aluminium:Nickel:Cobalt and the like. Flake Nickel materials can be used; in addition Iron flake materials are suitable. Typical nickel flakes have lateral dimensions in the range 5-50 microns and a thickness less than 2 microns. Typical iron flakes have lateral dimensions in the range 10-30 microns and a thickness less than 2 microns.

In an alternative machine-readable embodiment a transparent magnetic layer can be incorporated at any position within the device structure. Suitable transparent magnetic layers containing a distribution of particles of a magnetic material of a size and distributed in a concentration at which the magnetic layer remains transparent are described in WO03091953 and WO03091952.

In a further example the security device of the current invention may be incorporated in a security document such that the device is incorporated in a transparent region of the document. The security document may have a substrate formed from any conventional material including paper and polymer. Techniques are known in the art for forming transparent regions in each of these types of substrate. For example, WO8300659 describes a polymer banknote formed from a transparent substrate comprising an opacifying coating on both sides of the substrate. The opacifying coating is omitted in localised regions on both sides of the substrate to form a transparent region.

EP1141480 describes a method of making a transparent region in a paper substrate. Other methods for forming transparent regions in paper substrates are described in EP0723501, EP0724519, EP1398174 and WO03054297.

The invention claimed is:

1. A security device having a lenticular device, the security device comprising:
   an array of sets of image strips;
   an array of lenticular focusing elements disposed over the array of sets of image strips such that at different viewing directions, a corresponding image strip from each set is viewed via respective ones of the lenticular focusing elements, wherein:
   the image strips are formed by a relief structure, and
   the relief structure includes raised features provided with ink.

2. The device according to claim 1, wherein the raised features are provided with the same colour ink.

3. The device according to claim 1, wherein some raised features are provided with an ink different in colour from the ink provided on other raised features.

4. The device according to claim 1, wherein pairs of raised features are provided with the same ink, the ink varying between adjacent pairs.

5. The device according to claim 1, wherein the lenticular focusing elements comprise cylindrical lenses or micromirrors.

6. The device according to claim 1, wherein the image strip relief structure is provided in a substrate which includes at least one other relief structure separate from the lenticular device.

7. The device according to claim 6, wherein the at least one other relief structure comprises a holographic structure.

8. An article provided with a security device according to claim 1.

9. The article according to claim 8, wherein the article is selected from banknotes, cheques, passports, identity cards, certificates of authenticity, fiscal stamps and other documents for securing value or personal identity.

10. A security device having a lenticular device, the security device comprising:
    an array of sets of image strips;
    an array of lenticular focusing elements disposed over the array of sets of image strips such that at different viewing directions, a corresponding image strip from each set is viewed via respective ones of the lenticular focusing elements, wherein:
    the image strips are formed by a relief structure, and
    the image strip relief structure is provided in a substrate which includes at least one other relief structure separate from the lenticular device.

11. The device according to claim 10, wherein the relief structure comprises diffractive grating structures.

12. The device according to claim 10, wherein the relief structure is partially or completely metallised or has a high refractive index layer provided thereover.

13. The device according to claim 10, wherein the relief structure includes recesses filled with ink.

14. The device according to claim 13, wherein different ones of the raised relief features or recesses are provided with different coloured inks.

15. The device according to claim 10, wherein the relief structure comprises raised features provided with ink.

16. The device according to claim 10, wherein the lenticular focusing elements comprise cylindrical lenses or micromirrors.

17. The device according to claim 10, wherein the at least one other relief structure comprises a holographic structure.

18. The device according to claim 10, wherein the at least one other relief structure comprises microimages suitable for moiré magnification, the security device further comprising a moiré magnification lens array located over the microimages.

19. The device according claim 18, wherein the lenticular focusing elements also provide the moiré magnification lens array.

20. An article provided with a security device according to claim 10.

21. The article according to claim 20, wherein the article is selected from banknotes, cheques, passports, identity cards, certificates of authenticity, fiscal stamps and other documents for securing value or personal identity.

22. The article according to claim 20, wherein the article comprises a substrate with a transparent portion on opposite sides of which the lenticular focusing elements and image strips respectively are provided.

23. A method of manufacturing a security device, the method comprising:
- providing an array of lenticular focusing elements on one side of a transparent substrate; and
- providing a corresponding array of sets of image strips on the other side of the transparent substrate, the image strips and lenticular focusing elements defining a lenticular device such that at different viewing directions a corresponding image strip from each set is viewed via respective lenticular focusing elements, wherein:
- the image strips are formed by a relief structure, and
- the relief structure includes raised features provided with ink.

24. The method according to claim 23, wherein the manufacturing steps are carried out by passing the transparent substrate between two rolls, one roll being adapted to impress the lenticular focusing element array into one side of the substrate and the other roll being adapted to impress the image strip relief structure into the other side of the substrate simultaneously.

25. The method according to claim 23, further comprising providing at least one other relief structure on the substrate separate from the lenticular device.

26. A method of manufacturing a security device, the method comprising:
- providing an array of lenticular focusing elements on one side of a transparent substrate; and
- providing a corresponding array of sets of image strips on the other side of the transparent substrate, the image strips and lenticular focusing elements defining a lenticular device such that at different viewing directions a corresponding image strip from each set is viewed via respective lenticular focusing elements, wherein:
- the image strips are formed by a relief structure, and
- the image strip relief structure is provided in a substrate which includes at least one other relief structure separate from the lenticular device.

* * * * *